United States Patent
Yamada et al.

(10) Patent No.: US 9,404,996 B2
(45) Date of Patent: Aug. 2, 2016

(54) POSITION ESTIMATION DEVICE, POSITION ESTIMATION METHOD, PROGRAM, AND INTEGRATED CIRCUIT

(71) Applicant: Panasonic Intellectual Property Corporation of America, Torrance, CA (US)

(72) Inventors: Kazunori Yamada, Hyogo (JP); Mitsuaki Oshima, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 160 days.

(21) Appl. No.: 13/818,817

(22) PCT Filed: Oct. 12, 2012

(86) PCT No.: PCT/JP2012/006553
§ 371 (c)(1),
(2) Date: Feb. 25, 2013

(87) PCT Pub. No.: WO2013/065240
PCT Pub. Date: May 10, 2013

(65) Prior Publication Data
US 2014/0206381 A1    Jul. 24, 2014

(30) Foreign Application Priority Data
Oct. 31, 2011  (JP) .................................. 2011-238149

(51) Int. Cl.
*G01S 5/10* (2006.01)
*H04W 4/04* (2009.01)
(Continued)

(52) U.S. Cl.
CPC ................. *G01S 5/10* (2013.01); *G01S 5/0263* (2013.01); *G01S 5/14* (2013.01); *H04W 4/04* (2013.01); *H04W 52/0245* (2013.01); *H04W 52/0251* (2013.01)

(58) Field of Classification Search
CPC .............. H04W 4/04; H04W 52/0245; H04W 52/0251; G01S 5/0263; G01S 5/10; G01S 5/14
USPC ............................................. 455/456.1–456.6
See application file for complete search history.

(56) References Cited

U.S. PATENT DOCUMENTS 7,139,562 B2   11/2006  Matsui
8,060,107 B2   11/2011  Takizawa et al.
(Continued)

FOREIGN PATENT DOCUMENTS

JP   2001-235337   8/2001
JP   2003-296273   10/2003
(Continued)

OTHER PUBLICATIONS

International Search Report issued Nov. 20, 2012 in corresponding International Application No. PCT/JP2012/006553.
(Continued)

*Primary Examiner* — Nathan Taylor
(74) *Attorney, Agent, or Firm* — Wenderoth, Lind & Ponack, L.L.P.

(57) ABSTRACT

A position estimation device including: a provisional position setting unit which sets current position information indicating an estimated current position of a wireless terminal; a distance estimation unit which estimates, using receiving strengths of signals received from plural wireless stations, distance information indicating distances from the plural wireless stations to the wireless terminal; a possible area calculation unit which calculates, using the distance information and map information indicating a spatial structure, an area in the spatial structure which can maintain the distances indicated in the distance information, as a possible area in the spatial structure in which the wireless terminal is likely to be present; and a correction unit which corrects the current position indicated in the current position information to a position within the possible area when the current position is outside the possible area.

16 Claims, 23 Drawing Sheets

(51) Int. Cl.
*G01S 5/14* (2006.01)
*G01S 5/02* (2010.01)
*H04W 52/02* (2009.01)

(56) References Cited

U.S. PATENT DOCUMENTS

| | | | |
|---|---|---|---|
| 8,214,459 B2 | 7/2012 | Matsubara et al. | |
| 8,233,910 B2 | 7/2012 | Sawai | |
| 8,549,109 B2 | 10/2013 | Matsubara et al. | |
| 8,892,688 B2 | 11/2014 | Matsubara et al. | |
| 2002/0118723 A1* | 8/2002 | McCrady | G01S 5/021 375/130 |
| 2003/0187922 A1 | 10/2003 | Ohara | |
| 2004/0121725 A1 | 6/2004 | Matsui | |
| 2006/0089154 A1* | 4/2006 | Laroia et al. | 455/456.2 |
| 2006/0234722 A1* | 10/2006 | Hanebeck | H04W 64/00 455/456.1 |
| 2007/0201421 A1* | 8/2007 | Huseth | 370/338 |
| 2008/0014963 A1* | 1/2008 | Takizawa | H04W 64/00 455/456.1 |
| 2009/0081950 A1 | 3/2009 | Matsubara et al. | |
| 2009/0213009 A1* | 8/2009 | Ishiwatari | G01S 5/021 342/450 |
| 2010/0135178 A1* | 6/2010 | Aggarwal et al. | 370/252 |
| 2010/0318289 A1 | 12/2010 | Sambongi | |
| 2011/0007901 A1 | 1/2011 | Ikeda et al. | |
| 2011/0074634 A1* | 3/2011 | Yeo | G01S 5/021 342/458 |
| 2011/0105142 A1* | 5/2011 | Sawai | G01S 5/02 455/456.1 |
| 2011/0112752 A1* | 5/2011 | Yokozawa | G01C 21/165 701/532 |
| 2011/0116453 A1* | 5/2011 | Huang et al. | 370/329 |
| 2011/0312278 A1 | 12/2011 | Matsushita et al. | |
| 2012/0019674 A1 | 1/2012 | Ohnishi et al. | |
| 2012/0119880 A1* | 5/2012 | Ponnuswamy | 340/8.1 |
| 2012/0246687 A1 | 9/2012 | Matsubara et al. | |
| 2012/0290311 A1* | 11/2012 | Tara et al. | 705/2 |
| 2013/0038634 A1* | 2/2013 | Yamada | G09G 5/00 345/649 |
| 2013/0247117 A1* | 9/2013 | Yamada | G08C 17/02 725/93 |
| 2014/0020032 A1 | 1/2014 | Matsubara et al. | |
| 2015/0019970 A1 | 1/2015 | Matsubara et al. | |

FOREIGN PATENT DOCUMENTS

| | | |
|---|---|---|
| JP | 2004-048132 | 2/2004 |
| JP | 2004-166193 | 6/2004 |
| JP | 2004-297334 | 10/2004 |
| JP | 2005-164248 | 6/2005 |
| JP | 2006-099540 | 4/2006 |
| JP | 2006-105662 | 4/2006 |
| JP | 2006-146753 | 6/2006 |
| JP | 2006-287897 | 10/2006 |
| JP | 2007-43316 | 2/2007 |
| JP | 2007-201921 | 8/2007 |
| JP | 2007-271444 | 10/2007 |
| JP | 2007-304787 | 11/2007 |
| JP | 2008-17027 | 1/2008 |
| JP | 2008-39603 | 2/2008 |
| JP | 2008-306667 | 12/2008 |
| JP | 2009-080593 | 4/2009 |
| JP | 2009-198454 | 9/2009 |
| JP | 2010-93742 | 4/2010 |
| JP | 2012-255673 | 12/2012 |
| WO | 03/086005 | 10/2003 |
| WO | 2006/123413 | 11/2006 |
| WO | 2007/069323 | 6/2007 |
| WO | 2012/070250 | 5/2012 |
| WO | 2012/070251 | 5/2012 |

OTHER PUBLICATIONS

Chinese Office Action and Search Report mailed Feb. 3, 2015 in corresponding Chinese Application No. 201280002467.9 (with partial English Translation).

* cited by examiner

FIG. 4

| Wireless station ID | Receiving strength | Estimated distance | Distance accuracy |
|---|---|---|---|
| AP-1 | -44 dBm | 3 m | 90 |
| Mobile-2 | -60 dBm | 9 m | 80 |
| TV-1 | -54 dBm | 5 m | 60 |
| ⋮ | ⋮ | ⋮ | ⋮ |

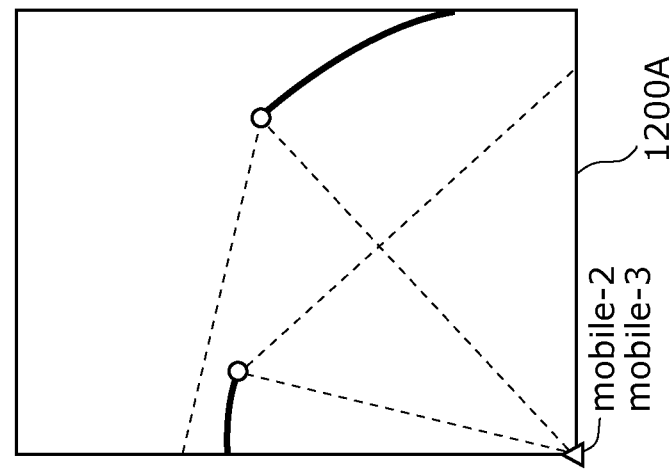
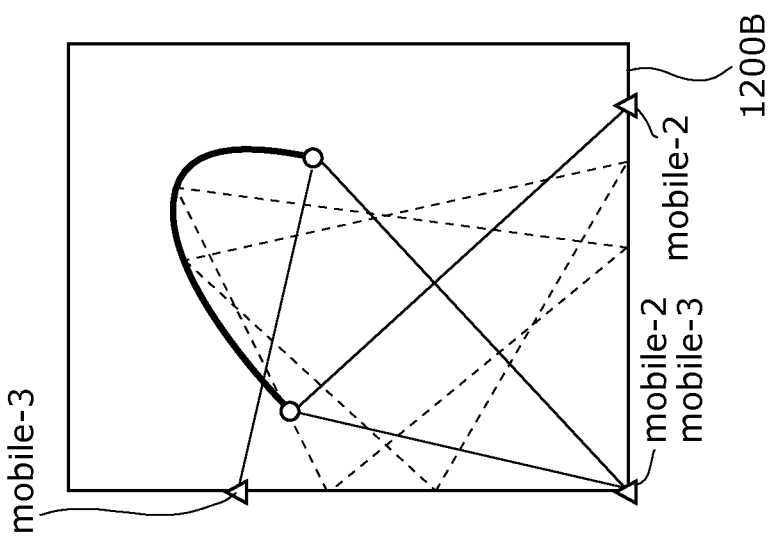
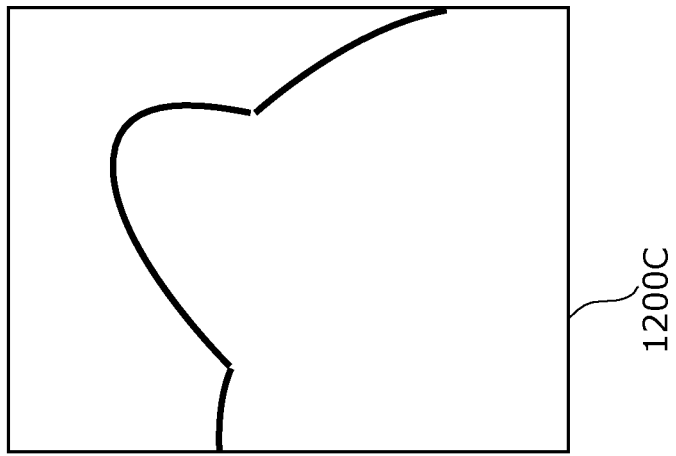

POSITION ESTIMATION DEVICE, POSITION ESTIMATION METHOD, PROGRAM, AND INTEGRATED CIRCUIT

TECHNICAL FIELD

The present invention relates to a position estimation device, a position estimation method, a program, and an integrated circuit for estimating a current position of a wireless terminal.

BACKGROUND OF INVENTION

Background Art

Recent years have seen a progress in the introduction of Home Energy Management System (HEMS) which connects various home appliances to a home network and controls the home appliances using information technology (IT) in order to manage power consumption considering environmental issues, for example.

The control performed by the HEMS includes turning on/off the home appliances according to the position of a user of the system, thereby requiring a high-accuracy indoor position estimation technique.

An example of indoor position estimation techniques is to estimate the position of a wireless terminal by calculating the distance from a wireless station which performs wireless communication, base on a property that the receiving strength of a signal from the wireless station attenuates according to the distance from the wireless station.

When there are few base stations whose positions are known in advance, Patent Literature (PTL) 1 obtains position information on a particular terminal by means of actual measurement and uses that particular terminal as a base station to increase the accuracy of the position estimation.

CITATION LIST

Patent Literature

[PTL 1] Japanese Unexamined Patent Application Publication No. 2008-17027

SUMMARY OF INVENTION

However, the above conventional method requires obtaining of the position information on a particular terminal by some kind of means of actual measurement, making it difficult to apply the conventional method to a wireless terminal which is not equipped with a means of actual measurement.

In view of the above problem, it is an object of the present invention to provide a position estimation device which, when there are few base stations whose positions are known in advance, increases the accuracy of the position estimation without requiring addition of a special positioning device.

To solve the above problem, the position estimation device according to an aspect of the present invention includes: a setting unit configured to set current position information indicating an estimated current position of a wireless terminal; an estimation unit configured to estimate, using receiving strengths of signals received from plural wireless stations including at least a mobile station, distance information indicating distances from the plural wireless stations to the wireless terminal; a calculation unit configured to calculate, using the distance information and map information indicating a spatial structure, an area in the spatial structure in which the wireless terminal satisfies the distances indicated in the distance information, as a possible area in the spatial structure in which the wireless terminal is likely to be present, the spatial structure including at least a layout of a building; and a correction unit configured to correct the current position indicated in the current position information to a position within the possible area when the current position is outside the possible area.

It is to be noted that these general or specific aspects may be realized using a system, a method, an integrated circuit, a computer program, or a computer-readable recording medium such as a CD-ROM, or any combination of systems, methods, integrated circuits, computer programs, or recording media.

A position estimation device according to an aspect of the present invention increases the accuracy of the position estimation without requiring addition of a special positioning device when there are few base stations whose positions are known in advance.

BRIEF DESCRIPTION OF DRAWINGS

FIG. 4 is a diagram showing a specific example of estimated distance information and distance accuracy information according to Embodiment 1.

FIG. 12A is a diagram for describing a method of calculating a possible area according to Embodiment 1.

FIG. 12B is a diagram for describing a method of calculating a possible area according to Embodiment 1.

FIG. 12C is a diagram for describing a method of calculating a possible area according to Embodiment 1.

DETAILED DESCRIPTION OF INVENTION

Figure 1:
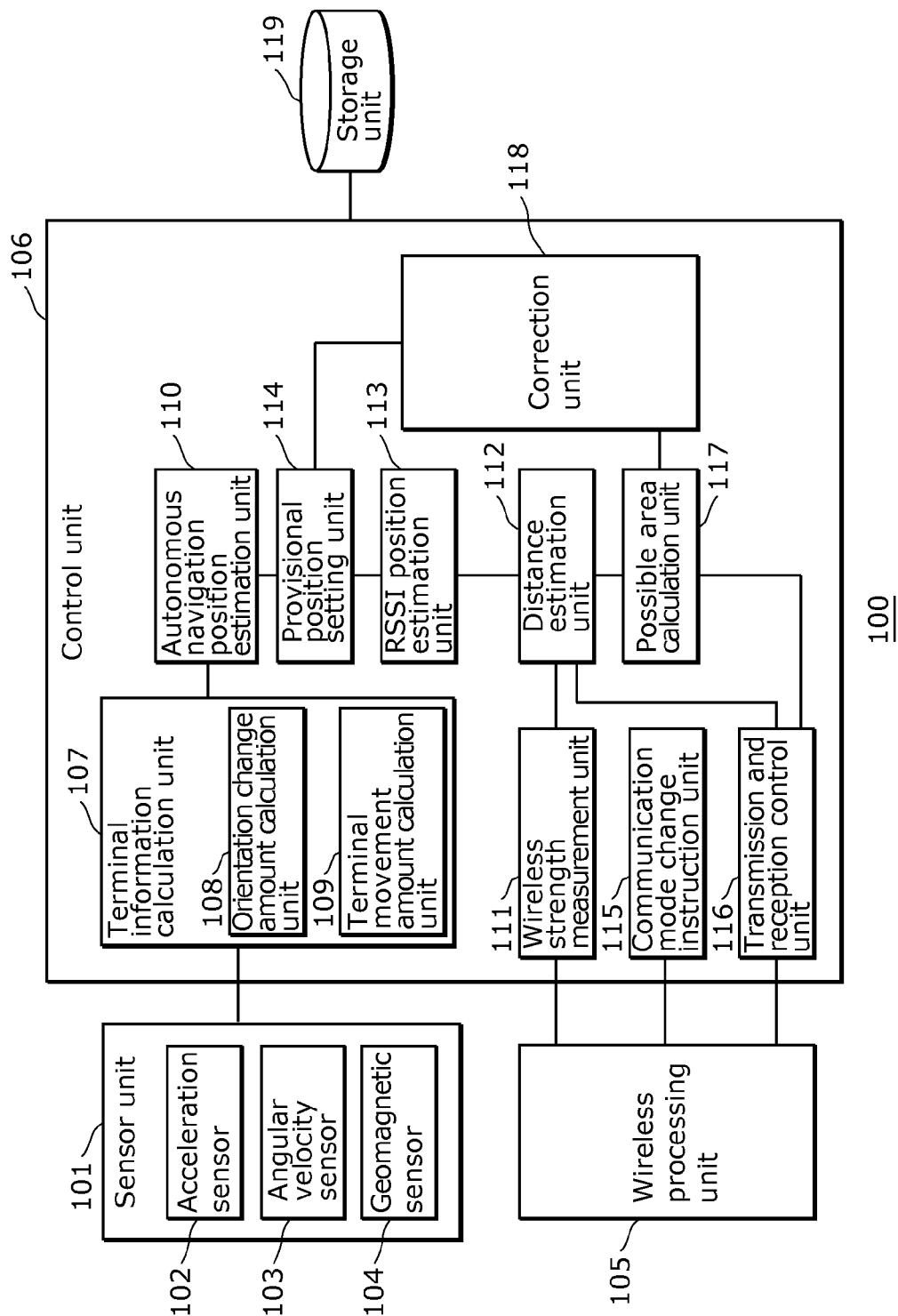
FIG. 1 is a block diagram showing a configuration of a position estimation device according to Embodiment 1.

To achieve the above object, a position estimation device according to a first aspect of the present invention includes: a setting unit configured to set current position information indicating an estimated current position of a wireless terminal; an estimation unit configured to estimate, using receiving strengths of signals received from plural wireless stations including at least a mobile station, distance information indicating distances from the plural wireless stations to the wireless terminal; a calculation unit configured to calculate, using the distance information and map information indicating a spatial structure, an area in the spatial structure in which the wireless terminal satisfies the distances indicated in the distance information, as a possible area in the spatial structure in which the wireless terminal is likely to be present, the spatial structure including at least a layout of a building; and a correction unit configured to correct the current position indicated in the current position information to a position within the possible area when the current position is outside the possible area.

With this configuration, using the map information and the distance information indicating the distances from the wireless stations increases the accuracy of the estimation of the position of the wireless terminal without requiring addition of a special positioning device even when there are few base stations whose positions are known in advance.

Thus, it is possible to provide a position estimation device which increases the accuracy of the position estimation without requiring addition of a special positioning device when there are few base stations whose positions are known in advance.

Here, for example, in the first aspect, a position estimation device according to a second aspect may be in the wireless terminal, for example.

Furthermore, for example, in the first or second aspect, a position estimation device according to a third aspect may be a position estimation device wherein the spatial structure indicated in the map information includes the layout of the building and a position, in the building, of an obstacle which attenuates a signal, and when the obstacle is present in the spatial structure in a first distance indicated in the distance information, the calculation unit is configured to calculate the possible area using a second distance which is obtained by correcting the first distance according to the obstacle.

With this configuration, the distance information is corrected according to the obstacle that attenuates the wireless signal, and thus it is possible to increase the accuracy of the estimation of the position of the wireless terminal.

Furthermore, for example, in the first to third aspect, a position estimation device according to a fourth aspect may be a position estimation device further including an instruction unit configured to instruct wireless stations which, among the plural wireless stations, belong to a same network to change a communication mode, wherein the estimation unit is configured to measure receiving strengths of signals transmitted by the wireless stations which have changed the communication mode in response to the instruction, and estimate the distance information using the measured receiving strengths.

With this configuration, it is possible to estimate the distance information indicating the distances from the wireless stations present in the same network and to use the distance information for the position estimation.

Furthermore, for example, in the first to fourth aspect, a position estimation device according to a fifth aspect may be a position estimation device further including, for example, an obtaining unit configured to communicate with each of the plural wireless stations and obtain wireless station information held by each of the plural wireless stations, wherein the calculation unit is configured to calculate the possible area using the map information, the distance information, and the wireless station information.

Here, for example, in the fifth aspect, a position estimation device according to a sixth aspect may be a position estimation device wherein the wireless stations include a mobile station and a fixed station, and the wireless station information, when held by one of the wireless stations which is a fixed station, includes position information indicating a position of the fixed station.

With this configuration, the possible area is calculated using the position information on the fixed station which belongs to the same network, and the position estimation is performed using the calculated possible area, and thus it is possible to increase the accuracy of the estimation of the position of the wireless terminal.

Furthermore, for example, in the fifth or sixth aspect, a position estimation device according to a seventh aspect may be a position estimation device wherein the wireless station information includes distance information indicating a distance between one of the wireless stations which holds the wireless station information and a different one of the wireless stations.

With this configuration, it is possible to calculate a relative positional relationship between the wireless stations that belong to the same network using the distance information which is held by each wireless station and indicates the distance between the wireless station and another wireless station, and to calculate the possible area using the relative positional relationship between the wireless stations that belong to the same network. As a result, it is possible to increase the accuracy of the estimation of the position of the wireless terminal performed using the calculated possible area.

Furthermore, for example, in the fifth to seventh aspect, a position estimation device according to an eighth aspect may be a position estimation device wherein, for example, the wireless station information includes a transmitting strength of a signal transmitted by the wireless station holding the wireless station information, and the estimation unit is configured to estimate the distance information using the receiving strengths and the transmitting strength.

With this configuration, it is possible to increase the accuracy of the estimation of the distance from the wireless station, and this leads to an increase in the accuracy of the estimation of the position of the wireless terminal.

Furthermore, for example, in the first to eighth aspect, a position estimation device according to a ninth aspect may be a position estimation device further including, for example, a detection unit configured to detect acceleration information on the wireless terminal and direction information on the wireless terminal, wherein the setting unit is configured to set, as the current position information, a current position estimated by autonomous navigation using the acceleration information and the direction information detected by the detection unit.

Furthermore, for example, in the first to eighth aspect, a position estimation device according to a tenth aspect may be a position estimation device wherein, for example, the estimation unit is configured to estimate, using a receiving strength of a signal received from a base station included in the plural wireless stations, distance information indicating a distance from the base station to the wireless terminal, and the setting unit is configured to set, as the current position information, a position of the wireless terminal estimated using the distance information indicating the distance from the base station to the wireless terminal and position information on the base station.

Furthermore, for example, in the first to eighth aspect, a position estimation device according to an eleventh aspect may be a position estimation device further including, for example: a detection unit configured to detect acceleration information on the wireless terminal and direction information on the wireless terminal; and an autonomous navigation position estimation unit configured to estimate the current position of the wireless terminal by autonomous navigation using the acceleration information and the direction information detected by the detection unit, wherein the setting unit is configured to set, as the current position information, the current position estimated by the autonomous navigation position estimation unit.

Furthermore, for example, in the eleventh aspect, a position estimation device according to a twelfth aspect may be a position estimation device further including a determination unit configured to determine whether or not the current position information set by the setting unit needs to be corrected, based on current position accuracy indicating accuracy of the current position estimated by the autonomous navigation position estimation unit, wherein the determination unit is configured to determine that the current position information needs to be corrected when the current position accuracy is lower than or equal to a threshold, and the calculation unit is configured to calculate the possible area only when the determination unit determines that the current position information needs to be corrected.

Furthermore, for example, in the twelfth aspect, a position estimation device according to a thirteenth aspect may be a position estimation device wherein the current position accuracy has a value which decreases with increase in interval between a first time and a second time to indicate a decrease in the accuracy of the current position, the first time being a time at which the current position has been estimated by the autonomous navigation position estimation unit and the second time being a time at which a previous current position before the current position has been estimated by the autonomous navigation position estimation unit.

It is to be noted that these general and specific aspects may be realized using a system, a method, an integrated circuit, a computer program, or a computer-readable recording medium such as a CD-ROM, or any combination of systems, methods, integrated circuits, computer programs, or recording media.

Hereinafter, a position estimation device according to an aspect of the present invention will be specifically described using the drawings. It is to be noted that the embodiment described below shows one specific example of the present invention. The numerical values, shapes, materials, structural elements, the arrangement and connection of the structural elements, steps, the processing order of the steps etc., shown in the following embodiment are mere examples, and are therefore not intended to limit the present invention. Furthermore, among the structural elements in the following embodiment, structural elements not recited in any of the independent claims representing the most generic concepts are described as arbitrary structural elements.

Embodiment

Hereinafter, an embodiment of the present invention will be described using the drawings. A position estimation device 100 according to an aspect of the present invention, for example, is included in a wireless terminal such as a mobile phone, and has a function to estimate a current position of the wireless terminal (hereinafter referred to as "target terminal").

<1. Configuration>

FIG. 1 is a block diagram showing a configuration of the position estimation device 100 according to Embodiment 1. As shown in FIG. 1, the position estimation device 100 includes a sensor unit 101, a wireless processing unit 105, a control unit 106, and a storage unit 119. The sensor unit 101 includes an acceleration sensor 102, an angular velocity sensor 103, and a geomagnetic sensor 104. The control unit 106 includes a terminal information calculation unit 107, an autonomous navigation position estimation unit 110, a wireless strength measurement unit 111, a distance estimation unit 112, an RSSI position estimation unit 113, a provisional position setting unit 114, a communication mode change instruction unit 115, a transmission and reception control unit 116, a possible area calculation unit 117, and a correction unit 118. The terminal information calculation unit 107 includes an orientation change amount calculation unit 108 and a terminal movement amount calculation unit 109.

The sensor unit 101 is an example of a detection unit, and detects acceleration information on the target terminal and direction information on the target terminal, for example. Hereinafter, the acceleration sensor 102, the angular velocity sensor 103, and the geomagnetic sensor 104 included in the sensor unit 101 will be described.

The acceleration sensor 102 detects the acceleration of the target terminal in three axial directions, converts the detected acceleration into an electrical signal, and outputs the electrical signal to the terminal information calculation unit 107 as acceleration information.

The angular velocity sensor 103 detects the angular velocity of the target terminal in the three axial directions, converts the detected angular velocity into an electrical signal, and outputs the electrical signal to the terminal information calculation unit 107 as angular velocity information.

The geomagnetic sensor 104 detects the geomagnetism in the three axial directions, converts the detected geomagnetism into an electrical signal, and outputs the electrical signal to the terminal information calculation unit 107 as geomagnetism information.

The wireless processing unit 105 includes an antenna or the like, and has a function to transmit and receive a wireless signal to communicate with other wireless stations. Here, wireless stations refer to devices with a function to wirelessly communicate with other wireless stations. Examples of the wireless stations include a base station such as a master station of a mobile phone and a wireless LAN access point, a mobile station such, as a mobile phone and a PHS, and a fixed station which is fixed in position such as a television receiver with a wireless function.

In more detail, the wireless station is a generic name for wireless equipment and those who operate wireless equipment, and does not include what is intended for reception only. The present embodiment will be described assuming that the wireless stations include a mobile station, a fixed station, and a base station, and transmit at least a wireless signal. Furthermore, the present embodiment will be described assuming that the mobile station is a mobile phone or a PHS, for example, whose exact position is unknown. Moreover, the present embodiment will be described assuming that the exact position of the base station is known. It is to be noted that the fixed station is a station which is fixed in position, such as a television receiver, and whose position is not necessarily known; however, the present embodiment will be described assuming that the position of the fixed station, such as a television receiver with a wireless function, is known.

The orientation change amount calculation unit 108 calculates, based on the angular velocity information received from the sensor unit 101, an orientation change amount that is an amount of change in orientation from the previous position estimation, and outputs the calculated orientation change amount to the autonomous navigation position estimation unit 110. In the present embodiment, the orientation change amount is an amount of change in the angles of the target terminal which are detected in the three axial directions by the angular velocity sensor, and is calculated by integrating the angular velocity information.

The terminal movement amount calculation unit 109 calculates, based on the acceleration information and the geomagnetism information received from the sensor unit 101, a movement amount of the target terminal that is an amount of movement of the target terminal from the previous position estimation, and outputs the calculated movement amount of the target terminal to the autonomous navigation position estimation unit 110. In the present embodiment, used as the movement amount from the previous position estimation is a distance calculated by integrating twice the acceleration in the X-axis direction (east-west direction), the acceleration in the Y-axis direction (south-north direction), and the acceleration in the Z-axis direction (height) in the geocentric orthogonal coordinate system, which are calculated using the acceleration information and the geomagnetism information.

The autonomous navigation position estimation unit 110 includes a clock unit not shown in FIG. 1, and has (1) a function to measure a time period which has elapsed from the previous position estimation, (2) a function to add, to the position information obtained from the previous position estimation, the movement amount of the target terminal received from the terminal information calculation unit 107, to calculate autonomous position information indicating a position estimated by autonomous navigation, and (3) a function to calculate autonomous position accuracy information indicating the accuracy of the above provisional position, using the orientation change amount and the movement amount of the target terminal that are received from the terminal information calculation unit 107 and the above-mentioned elapsed time period. The autonomous navigation position estimation unit 110 outputs the calculated autonomous navigation position information and autonomous navigation accuracy information to the provisional position setting unit 114.

In such a manner, the autonomous navigation position estimation unit 110 estimates the current position of the target terminal by autonomous navigation using the acceleration information and the direction information that are detected by the sensor unit 101.

Here, the autonomous navigation accuracy information will be described. The input from the sensor unit contains a certain amount of error. In general, the more rapid the change is in the values detected (acceleration, angular velocity, and geomagnetic direction), the larger the error is. Furthermore, the error is generally accumulated with time.

In view of the above problem, the autonomous navigation position estimation unit 110 calculates, as the autonomous navigation accuracy information, a value which decreases with increase in each of the values of the orientation change amount of the target terminal, the movement amount of the target terminal, and the time period which has elapsed from the previous position estimation. In the present embodiment, the autonomous navigation position estimation unit 110 calculates, as the autonomous navigation accuracy information, (i) a value obtained by subtracting from 100 a quotient obtained by dividing the total three-axial orientation change amount of the target terminal in the directions by a predetermined threshold Tangle [rad] (e.g., n/18 [rad]), (ii) a value obtained by subtracting from 100 a quotient obtained by dividing the total three-axial movement amount of the target terminal by a predetermined threshold Tdistance [m] (e.g., 100 [mm]), and (iii) a value obtained by subtracting from 100 a quotient obtained by dividing the time period which has elapsed from the previous measurement by a predetermined threshold Ttime [s] (e.g., 100 [ms]), for example.

The wireless strength measurement unit 111 measures for each wireless station the receiving field strength of the signal received by the wireless processing unit 105. The wireless strength measurement unit 111 outputs the measured receiving field strength to the distance estimation unit 112 as receiving strength information associated with a wireless station ID which identifies a corresponding wireless station.

The distance estimation unit 112 is an example of an estimation unit, and estimates, using the receiving strengths of signals received from wireless stations including at least a mobile station, distance information indicating distances from the wireless stations to the target terminal, for example.

More specifically, the distance estimation unit 112 calculates an estimated distance to each wireless station and its accuracy using the receiving strength information received from the wireless strength measurement unit 111, and outputs each estimated distance and its accuracy associated with a wireless station ID to the RSSI position estimation unit 113 and the possible area calculation unit 117 as estimated distance information and distance accuracy information.

Here, when the storage unit 119 stores transmission output of the wireless station targeted for the distance estimation, the distance estimation unit 112 calculates the estimated distance information and the distance accuracy information using the transmission output.

Figure 2:
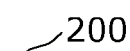
FIG. 2 is a diagram showing an example of base station management information according to Embodiment 1.

The transmission output of the base station among the wireless stations is stored in advance in the storage unit 119 together with data which is related to the base station and is to be used in processing described later. FIG. 2 is an example of base station management information 200. The base station management information 200 includes a set of base station ID records, and each base station ID record includes items of transmission output and position information. Here, each base station ID is ID information uniquely identifying a base station. The transmission output indicates the transmission power of radio waves of each base station, and the position information indicates the coordinates (latitude, longitude, and height) of each base station according to the geocentric orthogonal coordinate system.

Furthermore, the distance estimation unit 112 also calculates the estimated distance information and the distance accuracy information using the transmission output received from the transmission and reception control unit 116, when the distance estimation unit 112 has been able to obtain, through communication with another wireless station, the transmission output of the wireless station targeted for the distance estimation.

Figure 3:
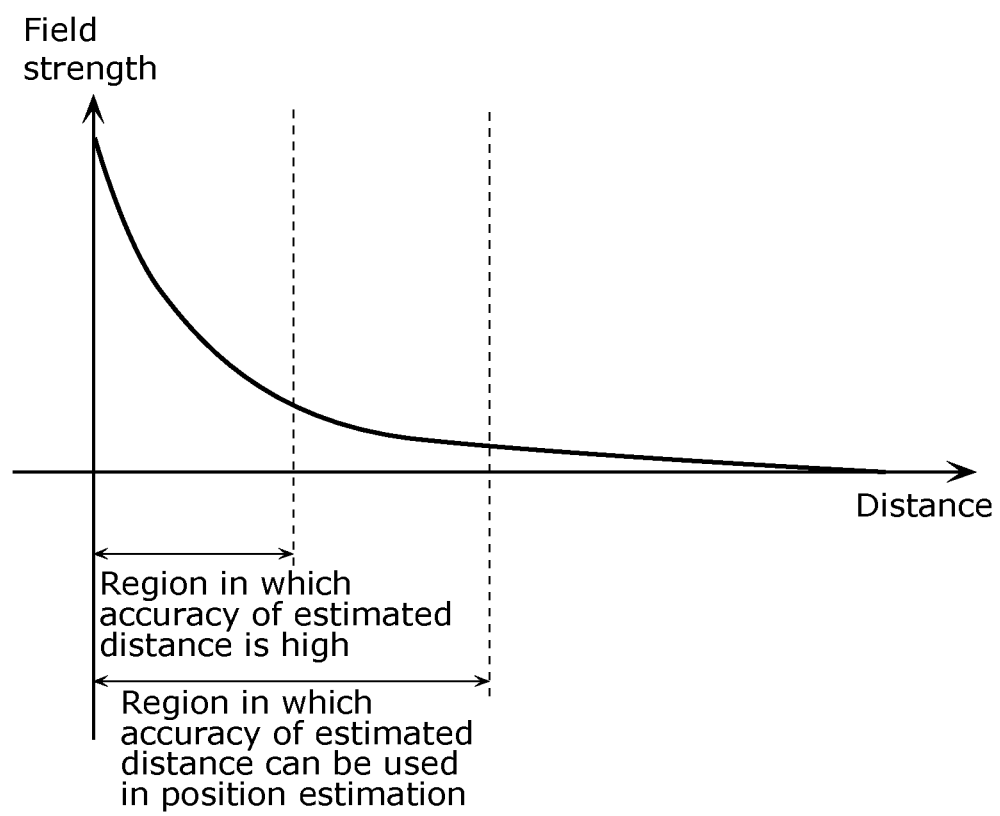
FIG. 3 is a diagram showing a relationship between receiving field strength and distance according to Embodiment 1.

Here, the above-mentioned distance accuracy information will be described. FIG. 3 is a diagram showing a relationship between wireless receiving field strength and distance. As shown in FIG. 3, the receiving field strength changes more significantly with decrease in the distance between the wireless station which has transmitted a signal and the wireless station which has received the signal. Thus, the greater the receiving field strength is, the more accurate the estimated distance information is. Accordingly, the distance estimation unit 112 calculates the distance accuracy information which increases in value with increase in the receiving strength.

In the above-described manner, the distance estimation unit 112 calculates the distance accuracy information and the estimated distance information according to the receiving strength.

FIG. 4 is an example of the estimated distance information and the distance accuracy information estimated and calculated by the distance estimation unit 112. FIG. 4 shows that the estimated distance information on wireless stations "AP1", "Mobile-2", and "TV-1" are "3 m", "9 m", and "5 m", respectively, and their distance accuracy are "90", "60", and "80", respectively. In other words, when the receiving strength is higher, the distance estimation unit 112 estimates a closer distance as the distance information and calculates higher accuracy as the distance accuracy.

Referring back to FIG. 1, the following continues with the description of each structural element.

Based on (i) the estimated distance information indicating the distances from the base stations and the distance accuracy information indicating the accuracy of that estimated distance information among the estimated distance information and the distance accuracy information received from the distance estimation unit 112 and (ii) the position information on the base stations stored in the storage unit 119, the RSSI position estimation unit 113 estimates RSSI position information indicating a position estimated based on the receiving field strength of the target terminal and calculates RSSI accuracy information indicating the accuracy of the RSSI position information, and outputs the RSSI position information and the RSSI accuracy information to the provisional position setting unit 114. The RSSI accuracy information in the present embodiment is, for example, the average value of the distance accuracy information of the estimated distance information used in estimating the RSSI position information.

Here, the RSSI position information estimated by the RSSI position estimation unit 113 will be described. For example, suppose that the RSSI position estimation unit 113 has received from the distance estimation unit 112 the distance information "L1", "L2", and "L3" indicating the distances from three base stations "AP1", "AP2", and "AP3", respectively, and that the respective position information (X1, Y1, X1), (X2, Y2, Z2), and (X3, Y3, Z3) on the base stations "AP-1", "AP-2", and "AP3" are stored in the storage unit 119. The RSSI position estimation unit 113 estimates, as the RSSI position information, intersections of the spherical surface of a circle having a radius L1 centering on the base station "AP-1" $((X-X1)^2+(Y-Y1)^2+(Z-Z1)^2=L1^2)$, the spherical surface of a circle having a radius L2 centering on the base station "AP2" $((X-X2)^2+(Y-Y2)^2+(Z-Z2)^2=L2^2)$, and the spherical surface of a circle having a radius L3 centering on the base station "AP3" $((X-X3)^2+(Y-Y3)^2+(Z-Z3)^2=L3^2)$. The above equations give two points as the RSSI position information; however, by, for example, using fourth distance information which fixes the Z-axis, the RSSI position information will be determined as one point.

The provisional position setting unit 114 is an example of a setting unit, and sets current position information indicating an estimated current position of the target terminal, for example. Here, for example, the provisional position setting unit 114 sets, as the current position information, the position information which is estimated by autonomous navigation using the acceleration information and the direction information on the target terminal that are detected by the sensor unit 101. Furthermore, for example, the provisional position setting unit 114 sets, as the current position information, the position of the target terminal estimated using the distance information indicating the distance from a base station to the target terminal and the position information on the base station. It is to be noted that in the present embodiment, the current position information indicating the estimated current position of the target terminal is also referred to as provisional position information indicating a provisional position (provisional current position) of the target terminal.

More specifically, the provisional position setting unit 114 calculates the provisional position information indicating the provisional position of the target terminal and provisional position accuracy information indicating the accuracy of the provisional position information based on the autonomous navigation position information and the autonomous navigation accuracy information received from the autonomous navigation position estimation unit 110 and the RSSI position information and the RSSI accuracy information received from the RSSI position estimation unit 113. The provisional position setting unit 114 outputs the calculated provisional position information and provisional position accuracy information to the correction unit 118. For example, the provisional position setting unit 114 calculates, as the provisional position information, a weighted average of the autonomous navigation position information and the RSSI position information using the autonomous navigation accuracy information and the RSSI accuracy information as weights, and calculates, as the provisional position accuracy information, an average value of the autonomous navigation accuracy information and the RSSI accuracy information.

It is to be noted that when the RSSI position estimation unit 113 cannot estimate the RSSI position information, the provisional position setting unit 114 outputs the autonomous navigation position information and the autonomous navigation accuracy information to the correction unit 118 as the provisional position information and the provisional position accuracy information.

Figure 5:
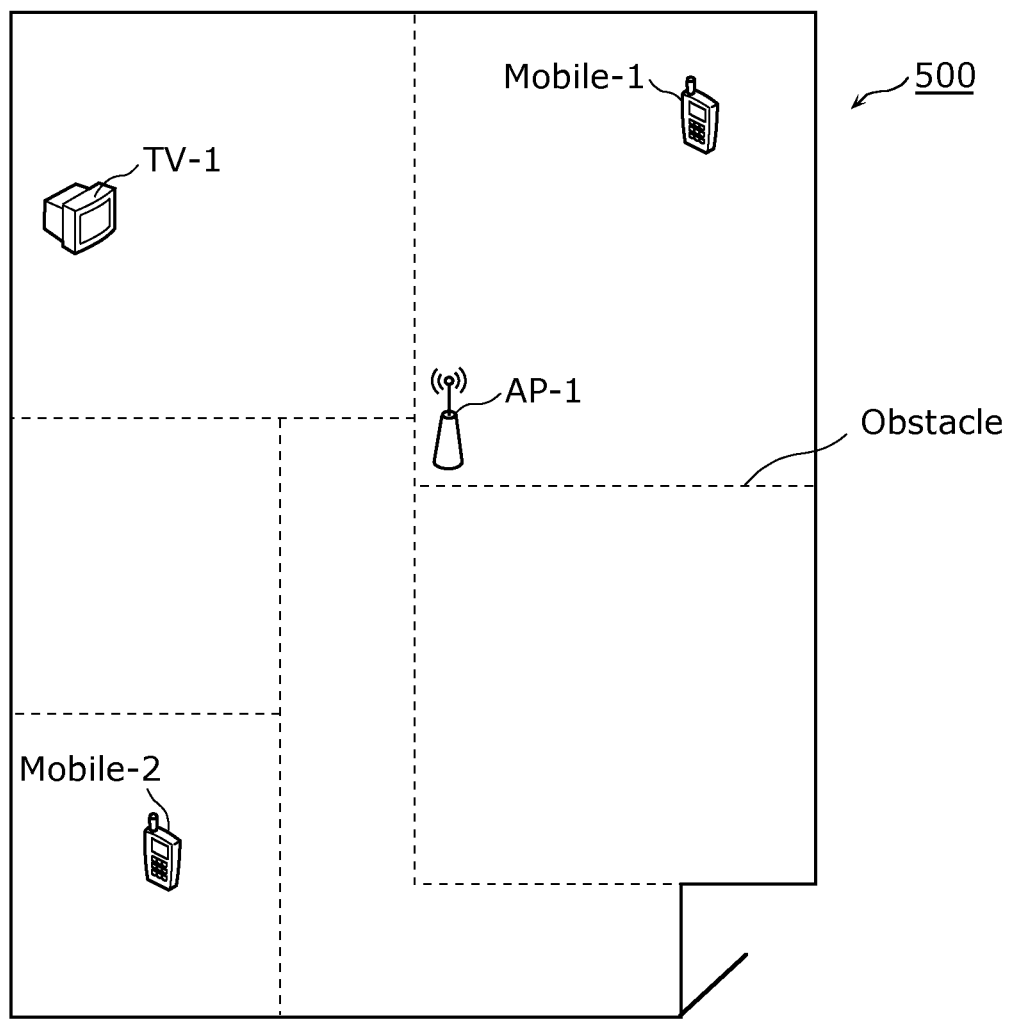
FIG. 5 is a diagram showing map information and an example of placement of wireless stations according to Embodiment 1.

FIG. 5 is a diagram showing map information and an example of placement of wireless stations according to Embodiment 1. Here, the map information is information indicating a spatial structure including at least a layout of a building. It is to be noted that the spatial structure indicated in the map information may include a layout of a building and the position, in the building, of an obstacle that attenuates a signal.

FIG. 5 shows map information 500 indicating the structure of a private space such as home and an example of placement of wireless stations in the map information. In general, there are plural wireless stations in a private space such as home, and the wireless terminals belong to the same network.

Referring back to FIG. 1, the following continues with the description.

The communication mode change instruction unit 115 is an example of an instruction unit, and instructs wireless stations which, among the plural wireless stations, belong to the same network to change the communication mode, for example. In that case, the distance estimation unit 112 measures the receiving strengths of signals transmitted by the wireless stations that have changed the communication mode in response to the above instruction, and estimates the distance information using the measured receiving strengths.

More specifically, the communication mode change instruction unit 115 instructs the wireless stations that belong to the same network to temporarily change the communication mode. The communication mode change instruction unit 115, for example, instructs a mobile station or a fixed station to (i) behave like a wireless access point as in the tethering mode or the like, or (ii) be in a similar state in the ad hoc mode or the like. Receiving the signals transmitted by the wireless stations in response to the above instruction enables the position estimation device 100 to calculate the estimated distance information even for the wireless stations other than the base station.

It is to be noted that the communication mode change instruction may instruct the wireless stations to (i) make an instant response (transmit information held by the wireless stations before changing the communication mode) or (ii) make a response after measurement is completed (transmit measured distance information and distance accuracy information when the wireless stations have a distance measuring function). In the case of the response after the measurement is completed, the target terminal can increase the accuracy of the distance information by using bidirectional distance information obtained by receiving the distance information indicating the distances from the wireless stations to the target terminal measured by the respective wireless stations. Furthermore, receiving the distance information which indicates the distances from the other wireless stations measured by the respective wireless stations enables the target terminal to obtain the distance information indicating relative distances between three wireless stations including the target terminal.

The transmission and reception control unit 116 is an example of an obtaining unit, and communicates with each of the plural wireless stations and obtains wireless station information held by each of the plural wireless stations, for example. Here, the wireless station information, when held by one of the wireless stations which is a fixed station, for example, includes position information indicating the position of the fixed station. Furthermore, the wireless station information may include distance information indicating the distance between one of the wireless stations which holds the wireless station information and a different one of the wireless stations. Moreover, the wireless station information may include a transmitting strength of a signal transmitted by the wireless station holding the wireless station information.

Figure 6:
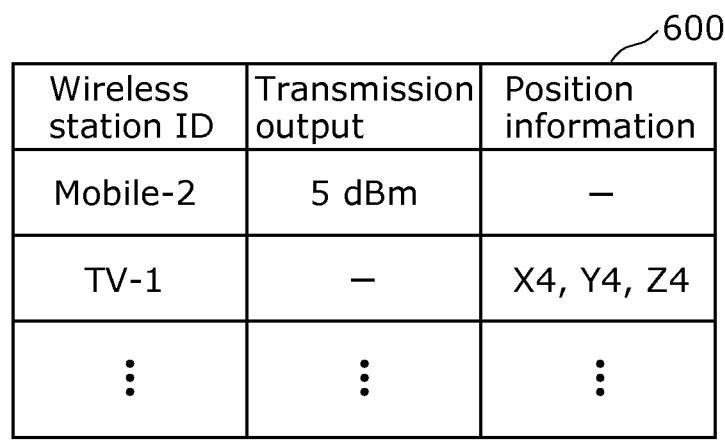
FIG. 6 is a diagram showing an example of wireless station information according to Embodiment 1.

More specifically, the transmission and reception control unit 116 communicates with the wireless stations that belong to the same network, and when each wireless station holds its transmission output or position information, obtains that transmission output or the position information. FIG. 6 is a specific example of wireless station information 600 in which the wireless station IDs and the obtained transmission output and position information are associated with each other. FIG. 6 shows that the transmission output of the wireless station "Mobile-2" and the position information on the wireless station "TV-1" have been obtained.

Figure 7:
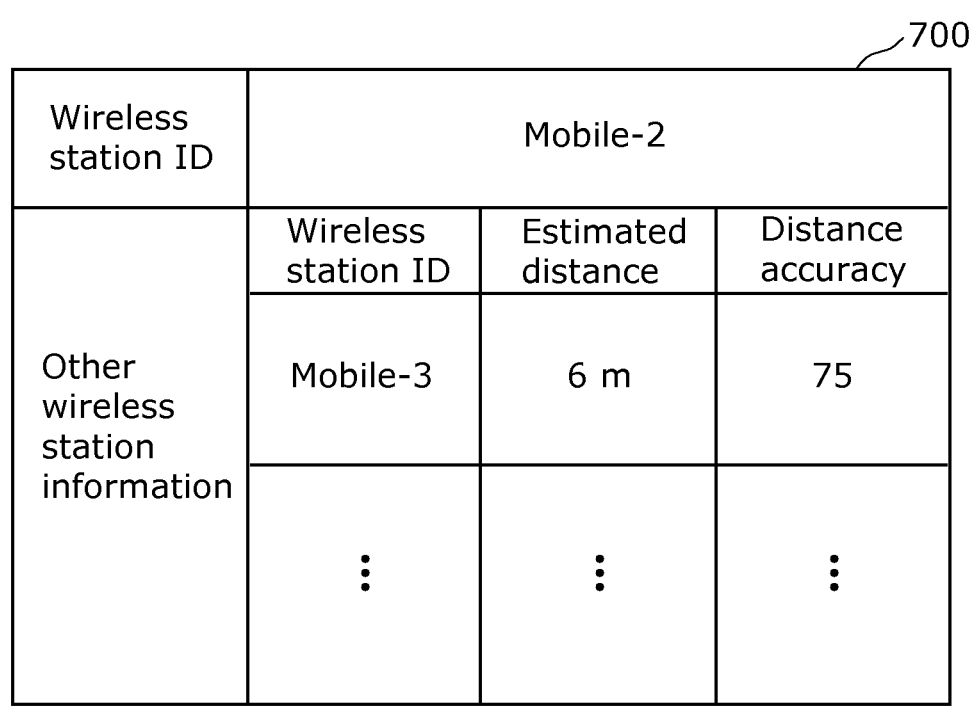
FIG. 7 is a diagram showing an example of other wireless station information according to Embodiment 1.

Furthermore, when the wireless stations that belong to the same network have, like the target terminal, a function to estimate the distances to the other wireless stations and hold the estimated distance information and the distance accuracy information, the transmission and reception control unit 116 obtains that estimated distance information and distance accuracy information. FIG. 7 is a specific example of other wireless station information 700 indicating the estimated distance information and the distance accuracy information held by the wireless stations. FIG. 7 shows that the wireless station "Mobile-2" holds the estimated distance information and the distance accuracy information on the wireless station "TV-1".

Referring back to FIG. 1, the following continues with the description. The transmission and reception control unit 116 outputs the obtained wireless station information 600 and other wireless station information 700 to the distance estimation unit 112 and the possible area calculation unit 117.

Next, the possible area calculation unit 117 will be described.

The possible area calculation unit 117 is an example of a calculation unit and calculates, using the map information and the distance information, an area in the spatial structure in which the target terminal satisfies the distances indicated in the distance information, as a possible area in the spatial structure indicated in the map information, in which the target terminal is likely to be present, for example.

More specifically, the possible area calculation unit 117 calculates, based on the estimated distance information received from the distance estimation unit 112, a possible area indicating an area in the space indicated in the map information, in which the target terminal is likely to be present, and outputs the possible area to the correction unit.

Here, an example of the map information will be described using FIG. 5.

As shown in FIG. 5, the map information includes the position of an obstacle (e.g., wall) which attenuates the signal transmitted by each wireless station. With the map information as shown in FIG. 5, the possible area calculation unit 117 calculates, as the possible area, an area in which the both ends of a line segment indicated by the estimated distance information are likely to be present.

Hereinafter, the method of calculating the possible area will be described in detail using the drawings. In the description, the target terminal targeted for the position estimation is shown with a circle as the wireless station ID "Mobile-1". Furthermore, the other wireless stations used in calculating the possible area are shown with triangles as the wireless station IDs "Mobile-2", "Mobile-3", and "TV-1".

Figure 8A:
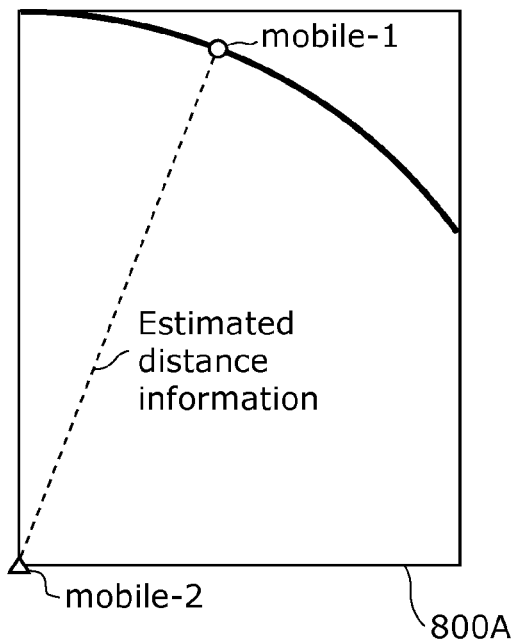
FIG. 8A is a diagram for describing a method of calculating a possible area according to Embodiment 1.
Figure 8B:
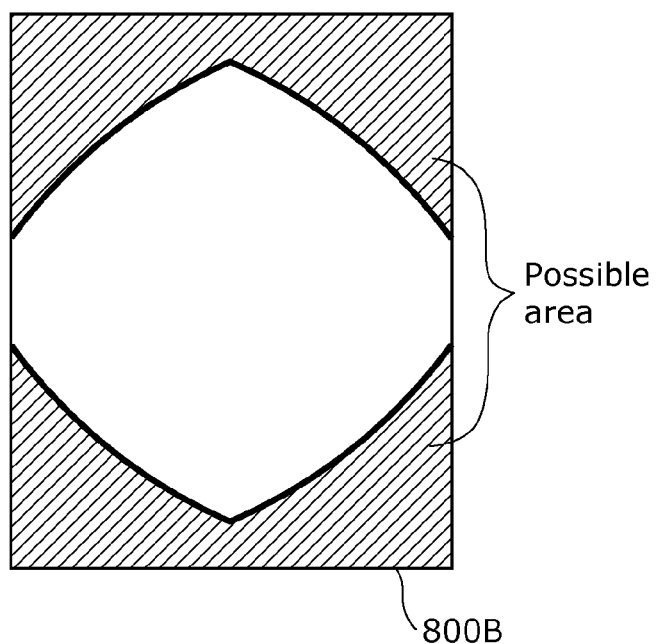
FIG. 8B is a diagram for describing a method of calculating a possible area according to Embodiment 1.

FIG. 8A and FIG. 8B are diagrams for describing the method of calculating the possible area when no obstacle is present on the map indicated in the map information. Here, a map 800A shown in FIG. 8A and a map 800B shown in FIG. 8B are spatial structures indicated in the map information, and each shows a layout of the same room in which no obstacle such as a wall is present.

First, as shown in FIG. 8A, the possible area calculation unit 117 fixes the wireless station "Mobile-2" at the bottom-left (south-west) corner among the four corners of the map, and measures the trajectory of the target terminal "Mobile-1" which is located apart by the distance indicated in the estimated distance information. The map 800A can be partitioned into two areas by the trajectory of the target terminal "Mobile-1". Among the two areas, the area which does not include the map's bottom-left (south-west) corner at which the wireless station "Mobile-2" is fixed is (1) the possible area of the target terminal "Mobile-1" when the target terminal "Mobile-1" is positioned above (north of) and right to (east of) the wireless station "Mobile-2".

The possible area calculation unit 117 fixes the wireless station "Mobile-2" at the bottom-right (south-east) corner, the upper-left (north-west) corner, and the upper-right (north-east) corner among the four corners of the map 800A, and performs the same processing to respectively calculate (2) the possible area of the target terminal "Mobile-1" when the target terminal "Mobile-1" is positioned above (north of) and left to (east of) the wireless station "Mobile-2", (3) the possible area of the target terminal "Mobile-1" when the target terminal "Mobile-1" is positioned below (south of) and right to (east of) the wireless station "Mobile-2", and (4) the possible area of the target terminal "Mobile-1" when the target terminal "Mobile-1" is positioned below (south of) and left to (west of) the wireless station "Mobile-2".

The possible area calculation unit 117 obtains a union of the calculated four possible areas to calculate the possible area of the target terminal "Mobile-1" when no obstacle is present on the map 800B indicated in the map information. FIG. 8B shows an example of the result of calculation of the possible area of the target terminal "Mobile-1".

In such a manner, the possible area calculation unit 117 calculates, as the possible area, a geometric area which can maintain, on the map 800B, the distance between the target terminal "Mobile-1" and the wireless station "Mobile-2".

Next, the following describes the case where an obstacle is present on the map.

As previously described, the map information in some cases includes an obstacle which attenuates a wireless signal. When the obstacle is present between, for example, the target terminal "Mobile-1" and the wireless station "Mobile-2" at the time of the calculation of the possible area, the possible area calculation unit 117 calculates the possible area using corrected distance information obtained by correcting the estimated distance information according to the type and number of obstacles.

More specifically, when an obstacle is present in a first distance indicated in the distance information in the spatial structure indicated in the map information, the possible area calculation unit 117 calculates the possible area using a second distance obtained by correcting the first distance according to the obstacle. This will be specifically described below.

Figure 9:
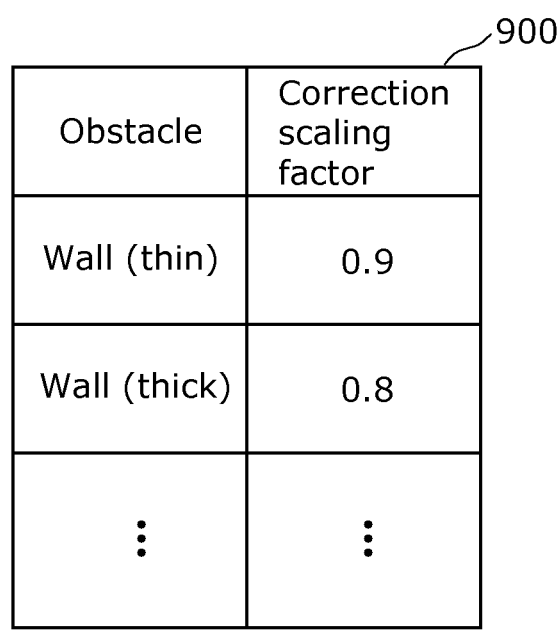
FIG. 9 is a diagram showing an example of association between types of obstacle and correction scaling factors according to Embodiment 1.

FIG. 9 is an example of a table 900 of types of obstacles and correction scaling factors. When a "wall (thin)" is present between the target terminal "Mobile-1" and the wireless station "Mobile-2", for example, the possible area calculation unit 117 calculates the possible area using the corrected distance information obtained by multiplying the estimated distance information by a correction scaling factor 0.9. Furthermore, when two obstacles, a "wall (thin)" and a "wall (thick) ", are present between the target terminal "Mobile-1" and the wireless station "Mobile-2", the possible area calculation unit 117 calculates the possible area using the corrected distance information obtained by multiplying the estimated distance information by a correction scaling factor 0.9×0.8=0.72.

Figure 10A:
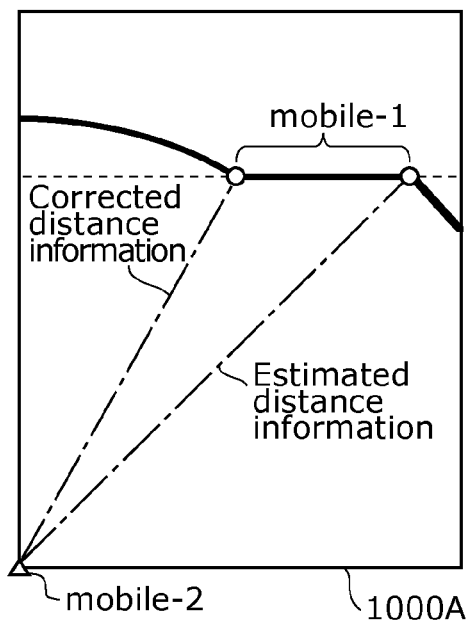
FIG. 10A is a diagram for describing a method of calculating a possible area according to Embodiment 1.
Figure 10B:
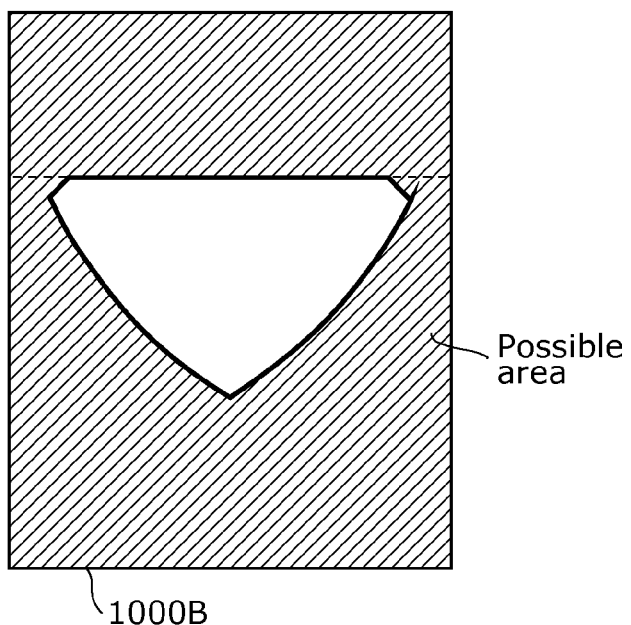
FIG. 10B is a diagram for describing a method of calculating a possible area according to Embodiment 1.

FIG. 10A and FIG. 10B are diagrams for describing the method of calculating the possible area when an obstacle is present on the map shown in the map information. Here, a map 1000A shown in FIG. 10A and a map 1000B shown in FIG. 10B are spatial structures indicated in the map information and each shows a layout of the same room in which an obstacle such as a wall is present.

First, as shown in FIG. 10A, the possible area calculation unit 117 fixes the wireless station "Mobile-2" at the bottom-left (south-west) corner among the four corners of the map 1000A, and measures the trajectory of the target terminal "Mobile-1". In doing so, as the distance between the target terminal "Mobile-1" and the wireless station "Mobile-2", the estimated distance information is used when no obstacle is present in between, and the corrected distance information obtained by correcting the estimated distance information according to the type and number of obstacles is used when an obstacle is present in between. The discontinuous points generated by the use of the two types of distance information are connected by a straight line which is used as the trajectory of the target terminal "Mobile-1".

The map 1000A can be partitioned into two areas by the trajectory of the target terminal "Mobile-1". Among the two areas, the area which does not include the map's bottom-left (south-west) corner at which the wireless station "Mobile-2" is fixed is (1) the possible area of the target terminal "Mobile-1" when the target terminal "Mobile-1" is positioned above (north of) and right to (east of) the wireless station "Mobile-2".

The possible area calculation unit 117 fixes the wireless station "Mobile-2" at the bottom-right (south-east) corner, the upper-left (north-west) corner, and the upper-right (north-east) corner among the four corners of the map 1000A, and performs the same processing to respectively calculate (2) the possible area of the target terminal "Mobile-1" when the target terminal "Mobile-1" is positioned above (north of) and left to (east of) the wireless station "Mobile-2", (3) the possible area of the target terminal "Mobile-1" when the target terminal "Mobile-1" is positioned below (south of) and right to (east of) the wireless station "Mobile-2", and (4) the possible area of the target terminal "Mobile-1" when the target terminal "Mobile-1" is positioned below (south of) and left to (west of) the wireless station "Mobile-2".

The possible area calculation unit 117 obtains a union of the calculated four possible areas to calculate the possible area of the target terminal "Mobile-1" when an obstacle is present on the map 1000B indicated in the map information. FIG. 10B shows an example of the result of calculation of the possible area of the target terminal "Mobile-1".

It is to be noted that when the transmission and reception control unit 116 obtains the position information on a wireless station among the pieces of information included in the wireless station information 600 an example of which is shown in FIG. 6, the possible area calculation unit 117 calculates the possible area using the position information on the wireless station.

Figure 11:
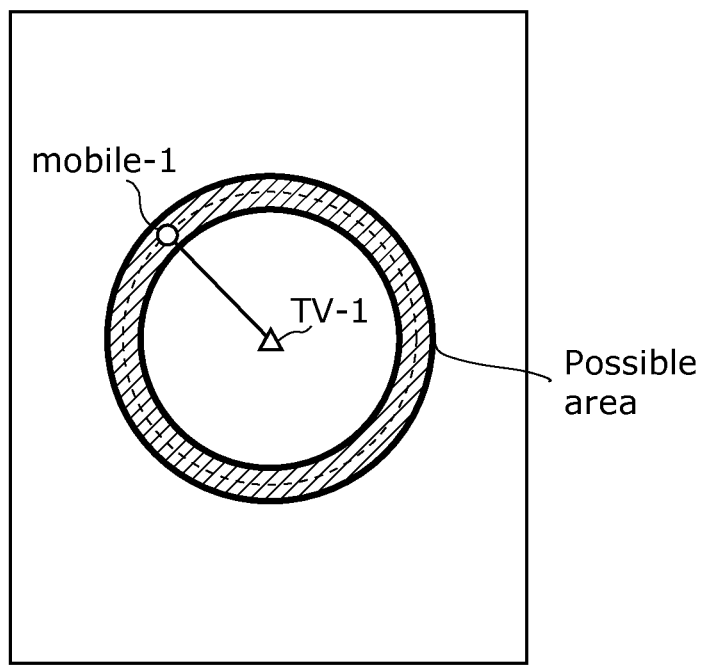
FIG. 11 is a diagram for describing a method of calculating a possible area according to Embodiment 1.

FIG. 11 is a diagram for describing the method of calculating the possible area using the position information on a wireless station. When the position information on the wireless station "TV-1" is obtained, the target terminal "Mobile-1" is present on the circumference of a circle having the estimated distance information as the radius centering on the wireless station "TV-1". With an error in the distance estimation taken into account, a doughnut-shaped area having a width which is proportional to the distance accuracy information received from the distance estimation unit 112 is determined as the possible area of the target terminal.

Here, when the transmission and reception control unit 116 obtains the other wireless station information 700 an example of which is shown in FIG. 7, the possible area calculation unit 117 calculates the possible area using the other wireless station information 700. For example, suppose that the estimated distance information indicating the distance between the wireless stations "Mobile-2" and "Mobile-3" has been received from the distance estimation unit 112 and that the estimated distance information L7 indicating the distance between the wireless stations "Mobile-2" and "Mobile-3" has been received from the transmission and reception control unit 116. In this case, a triangle showing relative positions of the target terminal "Mobile-1", the wireless station "Mobile-2", and the wireless station "Mobile-3" can be calculated using three pieces of distance information. When this triangle moves on the map, one of the triangle vertices which indicates the target terminal "Mobile-1" draws a trajectory which shows the possible area of the target terminal "Mobile-1".

FIG. 12A to FIG. 12C, FIG. 13A, and FIG. 13B are diagrams for describing the method of calculating the possible area using the other wireless station information 700. The following first describes the case where the triangle vertices indicate, clockwise, the target terminal "Mobile-1", the wireless station "Mobile-2", and the wireless station "Mobile-3". Here, a map 1200A shown in FIG. 12A, a map 1200B shown in FIG. 12B, and a map 1200C shown in FIG. 12C are spatial structures indicated in the map information, and each shows a layout of the same room in which no obstacle such as a wall is present.

As shown in FIG. 12A, the possible area calculation unit 117 fixes the wireless station "Mobile-2" at the bottom-left (south-west) corner among the four corners of the map 1200A, and measures the trajectory of the target terminal "Mobile-1" which is located apart by the distance indicated in the estimated distance information L2. Furthermore, the possible area calculation unit 117 fixes the wireless station "Mobile-3" at the bottom-left (south-west) corner among the four corners of the map 1200A, and measures the trajectory of the target terminal "Mobile-1".

Next, as shown in FIG. 12B, the possible area calculation unit 117 measures the trajectory of the target terminal "Mobile-1" while moving the wireless stations "Mobile-2" and "Mobile-3" along the edges (bottom edge and left edge) of the map 1200B from the state in which the wireless station "Mobile-2" is at the bottom-left (south-west) corner among the four corners of the map 1200B and the wireless station "Mobile-3" is at the left (west) edge of the map 1200B to the state in which the wireless station "Mobile-3" is at the bottom-left (south-west) corner among the four corners of the map 1200B and the wireless station "Mobile-2" is at the bottom (south) edge of the map 1200B.

The trajectory shown in FIG. 12C is obtained through this operation. Among the two areas partitioned into by this trajectory, the area which does not include the bottom-left (south-west) corner of the map 1200C is (1) the possible area of the target terminal "Mobile-1" when the target terminal "Mobile-1" is positioned above (north of) the wireless station "Mobile-2" and right to (east of) the wireless station "Mobile-3".

The possible area calculation unit 117 performs the same operation for the remaining four corners to calculate (2) the possible area of the target terminal "Mobile-1" when the target terminal "Mobile-1" is positioned right to (east of) the wireless station "Mobile-2" and below (south of) the wireless station "Mobile-3", (3) the possible area of the target terminal "Mobile-1" when the target terminal "Mobile-1" is positioned below (south of) the wireless station "Mobile-2" and left to (west of) the wireless station "Mobile-3", and (4) the possible area of the target terminal "Mobile-1" when the target terminal "Mobile-1" is positioned left to (west of) the wireless station "Mobile-2" and above (north of) the wireless station "Mobile-3".

The possible area calculation unit 117 obtains a union of the calculated four possible areas to calculate the possible area of the target terminal "Mobile-1" for the case where the other wireless station information is used. A map 1200D in FIG. 13A shows an example of the result of calculation of the possible area of the target terminal "Mobile-1".

Figure 13A:
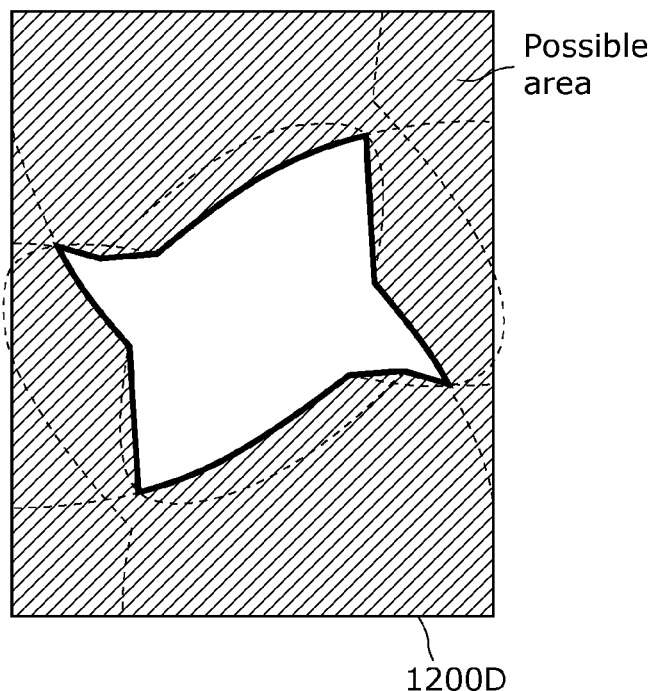
FIG. 13A is a diagram for describing a method of calculating a possible area according to Embodiment 1.
Figure 13B:
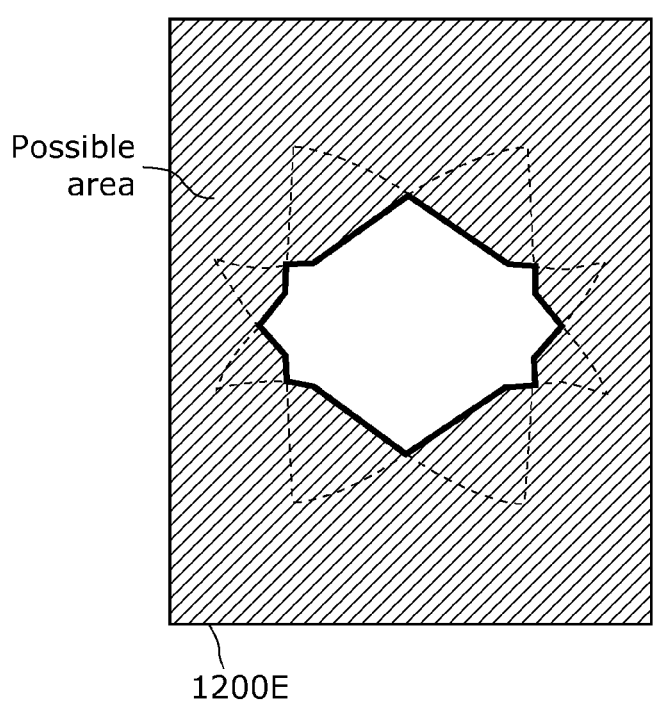
FIG. 13B is a diagram for describing a method of calculating a possible area according to Embodiment 1.

The possible area calculation unit 117 calculates the possible areas also for the case where the triangle vertices indicate, clockwise, the target terminal "Mobile-1", the wireless station "Mobile-3", and the wireless station "Mobile-2", and obtains a union of the calculated possible areas and the possible area shown in the map 1200D in FIG. 13A to calculate the possible area shown in a map 1200E in FIG. 13B.

In such a manner, the possible area calculation unit 117 calculates, as the possible area, a geometric area which can maintain (satisfy), on the map 1200E, the distance between the target terminal "Mobile-1" and the wireless station "Mobile-2", the distance between the target terminal "Mobile-1" and the wireless station "Mobile-3", the distance between the wireless station "Mobile-2" and the wireless station "Mobile-3".

The possible area calculated in this manner is determined as the possible area of the target terminal "Mobile-1" for the case where the other wireless station information is used.

The possible area calculation unit 117 obtains a product set of the plural possible areas calculated based on the received estimated distance information, wireless station information, and other wireless station information, and outputs the product set to the correction unit 118.

Next, FIG. 14 to FIG. 17 show an example of the calculation of the possible area in the map information and in the example of the placement of the wireless terminals shown in FIG. 5.

Figure 14:
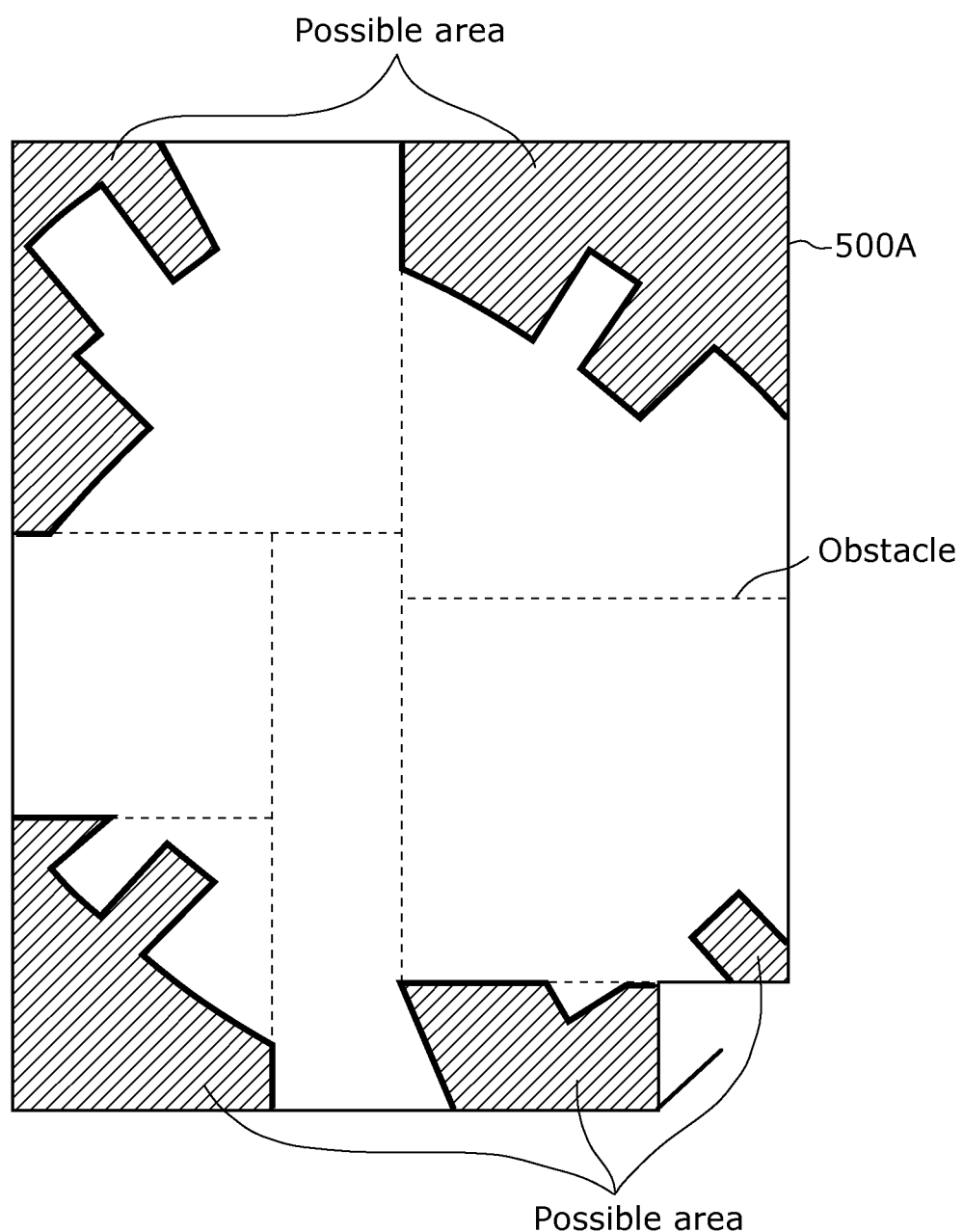
FIG. 14 is a diagram showing a specific example of a possible area calculated according to Embodiment 1.
Figure 15:
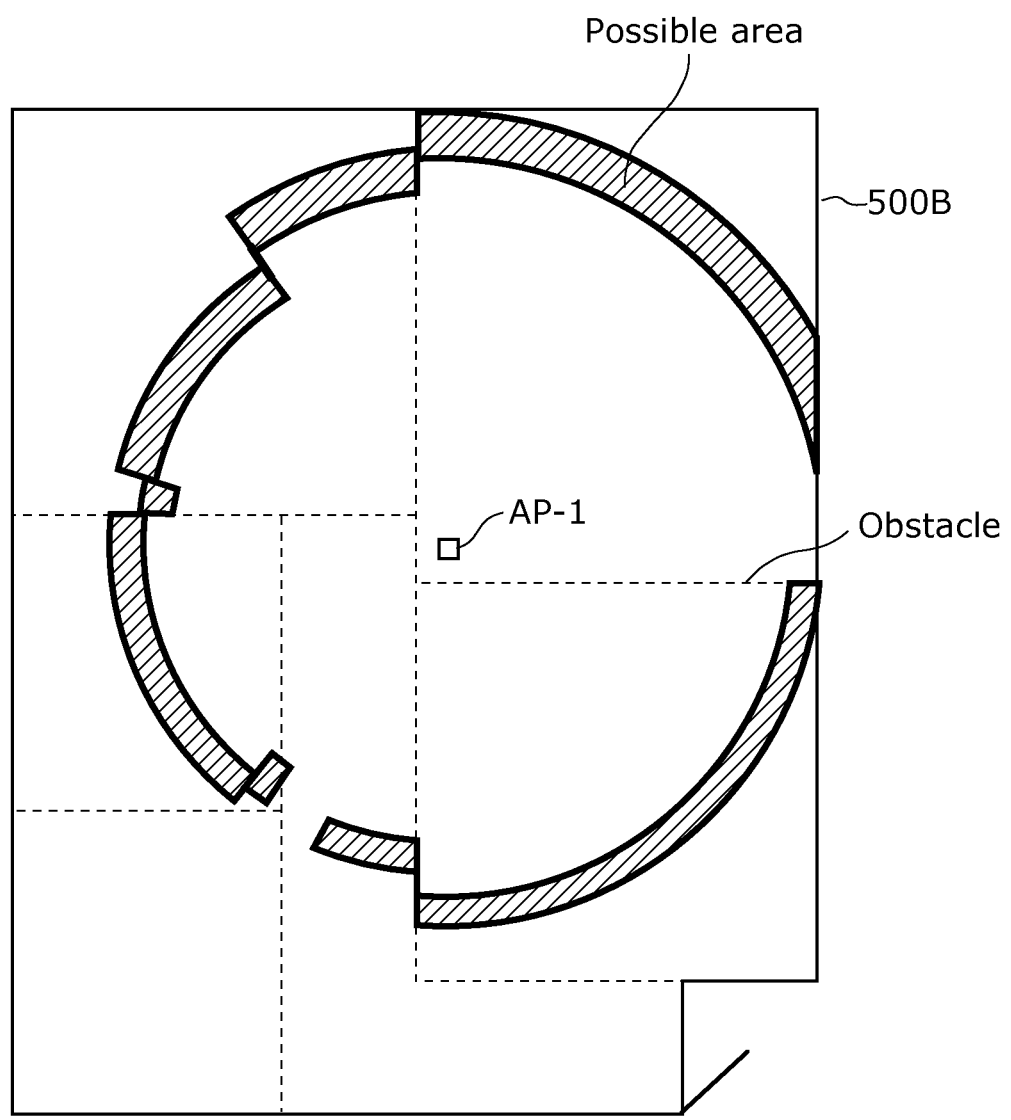
FIG. 15 is a diagram showing a specific example of a possible area calculated according to Embodiment 1.
Figure 16:
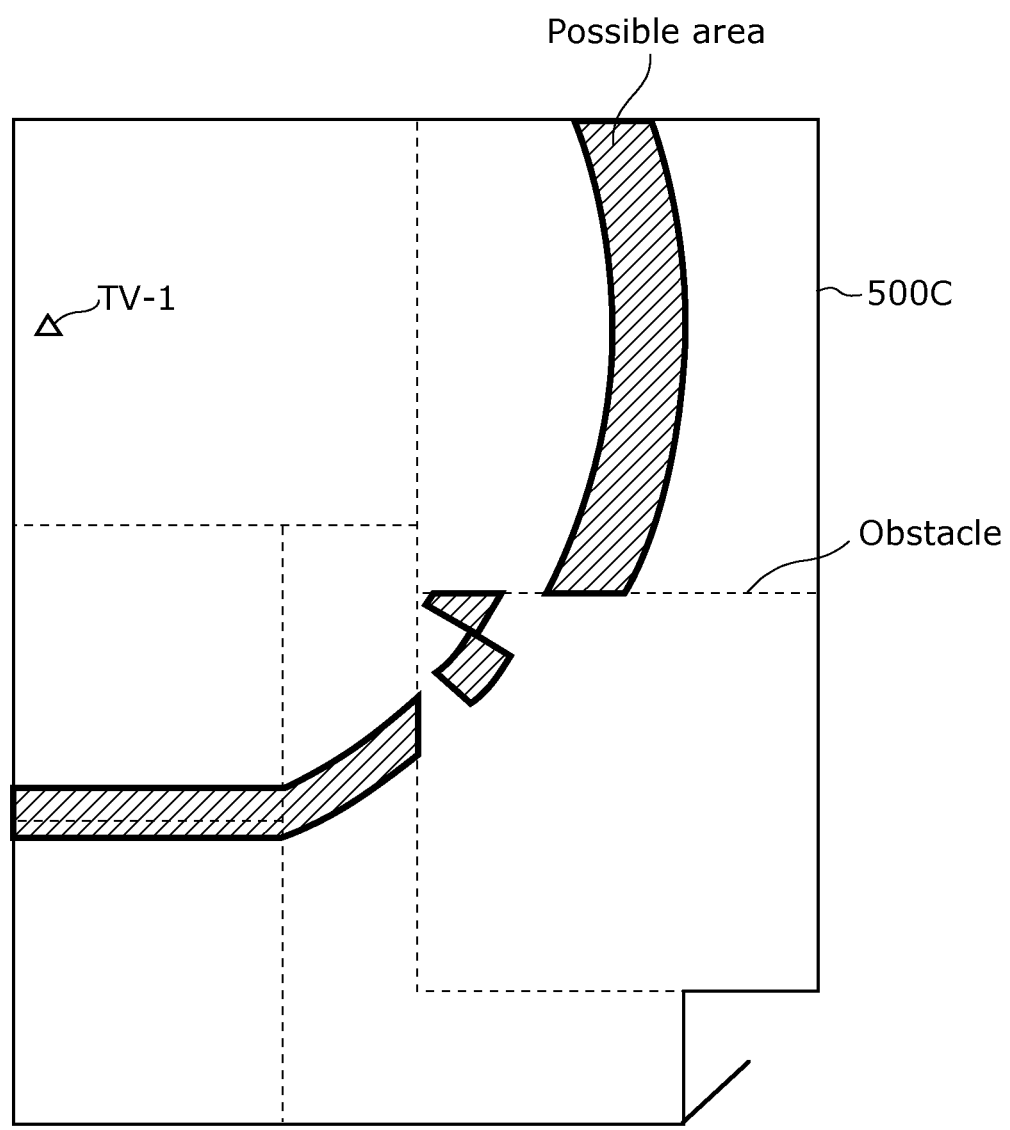
FIG. 16 is a diagram showing a specific example of a possible area calculated according to Embodiment 1.

FIG. 14 shows an example of the possible area calculated on a map 500A using the estimated distance information indicating the distance between the target terminal "Mobile-1" and the wireless station "Mobile-2". FIG. 15 shows an example of the possible area calculated on a map 500B using the estimated distance information indicating the distance between the target terminal "Mobile-1" and the wireless station "AP1" and the base station management information stored in the storage unit 119. FIG. 16 shows an example of the possible area calculated on a map 500C using the estimated distance information indicating the distance between the target terminal "Mobile-1" and the wireless station "TV-1" and the wireless station information obtained from the wireless station "TV-1".

Figure 17:
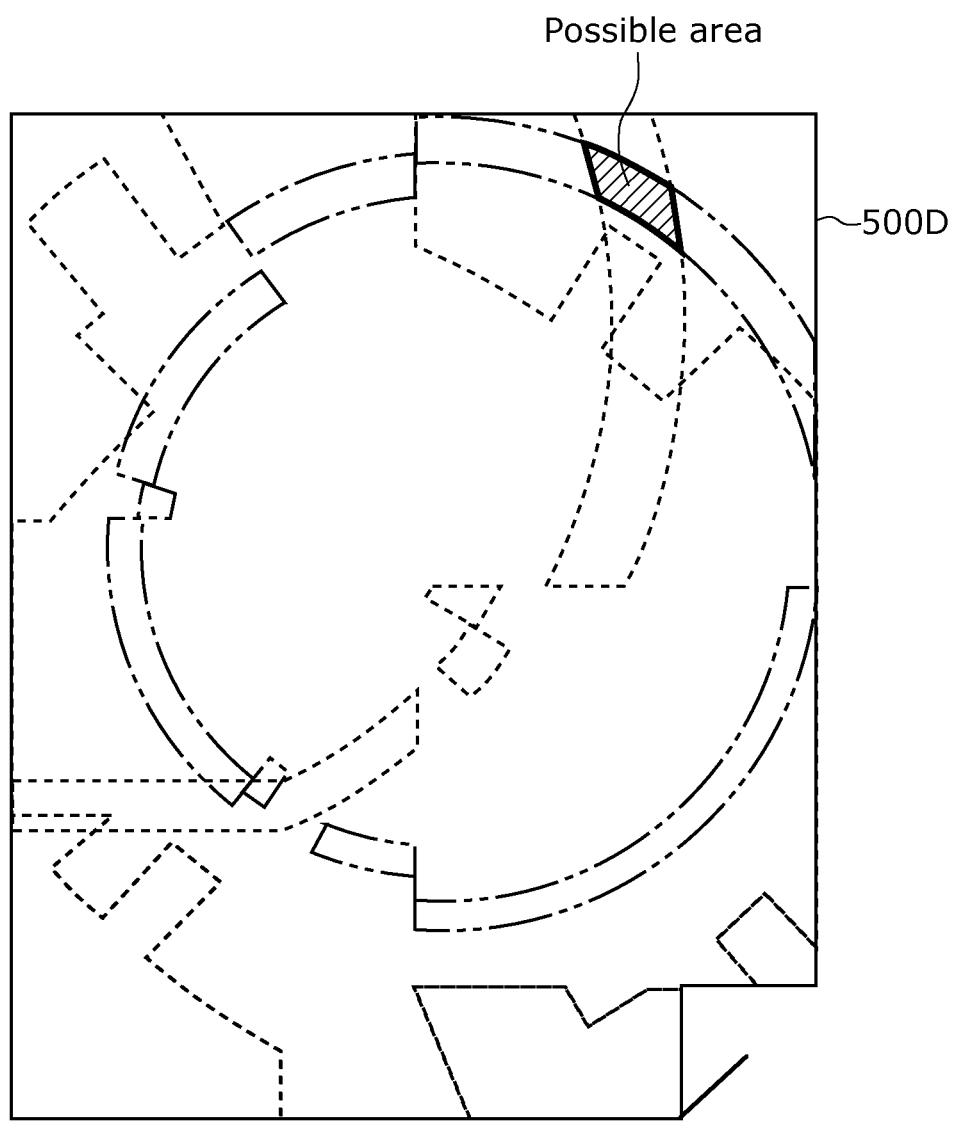
FIG. 17 is a diagram showing a specific example of a possible area calculated according to Embodiment 1.

The possible area calculation unit 117, for example, calculates these three possible areas and obtains a product set, and outputs the resulting possible area calculated on a map 500D shown in FIG. 17 to the correction unit 118.

Referring back to FIG. 1, the following continues with the description of the configuration of the position estimation device 100.

When the current position (provisional position) indicated in the current position information (provisional position information) is outside the possible area, the correction unit 118 corrects the current position to a position within the possible area. Specifically, the correction unit 118 corrects the provisional position information received from the provisional position setting unit, based on the possible area received from the possible area calculation unit 117.

More specifically, the correction unit 118 determines whether the coordinates indicated in the provisional position information are within or outside the possible area, and when the coordinates are outside the possible area, corrects the current position to a position, within the possible area, which is closest to the coordinates indicated in the provisional position information. In doing so, when there are plural positions within the possible area which are closest to the coordinates indicated in the provisional position information, the correction unit 118 corrects the current position indicated in the provisional position information to a position randomly selected from among the plural positions, for example. It is to be noted that when there are plural positions within the possible area which are closest to the coordinates indicated in the provisional position information, a position may be selected according to a predetermined rule (e.g., select the first position clockwise from the 12 o'clock direction, or select a position from among the plural positions which is close to the direction of the center of gravity) other than by random selection.

The storage unit 119 stores the map information indicating a spatial structure including at least a layout of a building. In the present embodiment, the storage unit 119 stores the base station management information 200, the map information 500, and the table 900 of obstacles and correction scaling factors.

It is to be noted that the possible area calculated in the above description is on a flat plane; however, a three-dimensional possible area can also be calculated using the same method. More specifically, the possible area can be calculated by measuring the trajectories of the target terminal using eight vertices as the center.

<2. Operations>

Next, operations of the position estimation device 100 according to the present embodiment will be described.

Figure 18:
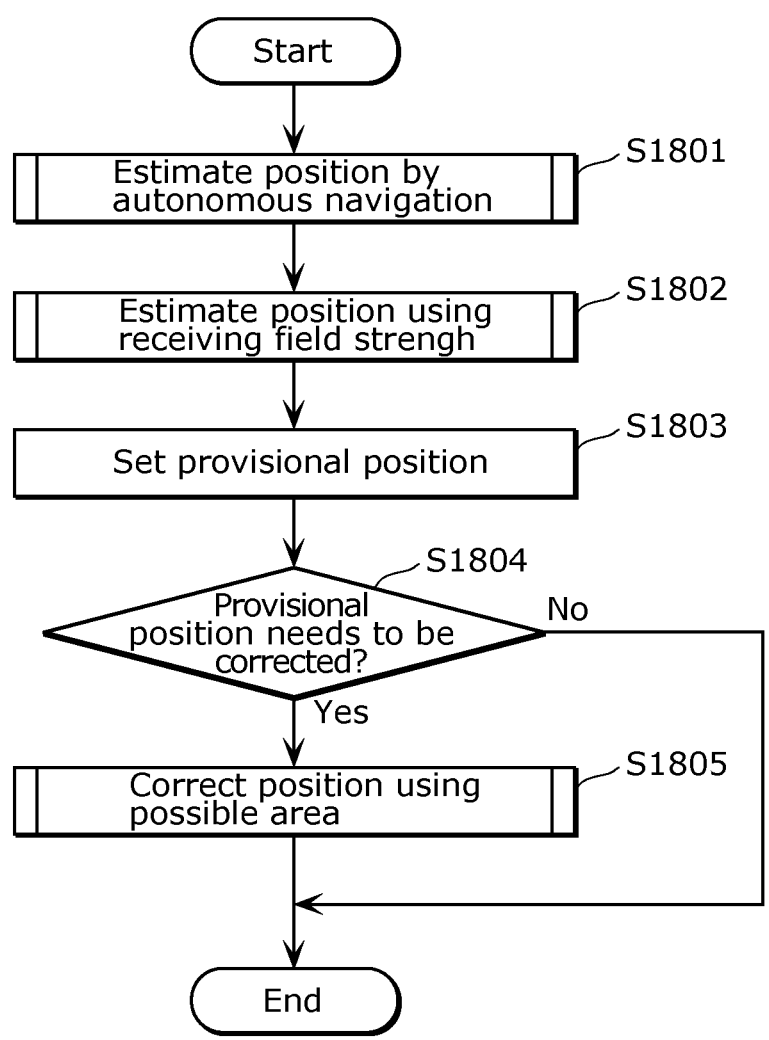
FIG. 18 is a flowchart showing operations of a position estimation device according to Embodiment 1.

FIG. 18 is a flowchart showing the entire operations of the position estimation device 100 according to the present embodiment. As shown in FIG. 18, the operations of the position estimation device 100 include the estimation of the autonomous navigation position information by autonomous navigation (S1801), the estimation of the RSSI position information using the receiving field strength (S1802), the setting of the provisional position information indicating a provisional position of the target terminal (S1803), the determination as to whether or not the provisional position information needs to be corrected (S1804), and the correction of the provisional position information using the possible area (S1805).

Figure 19:
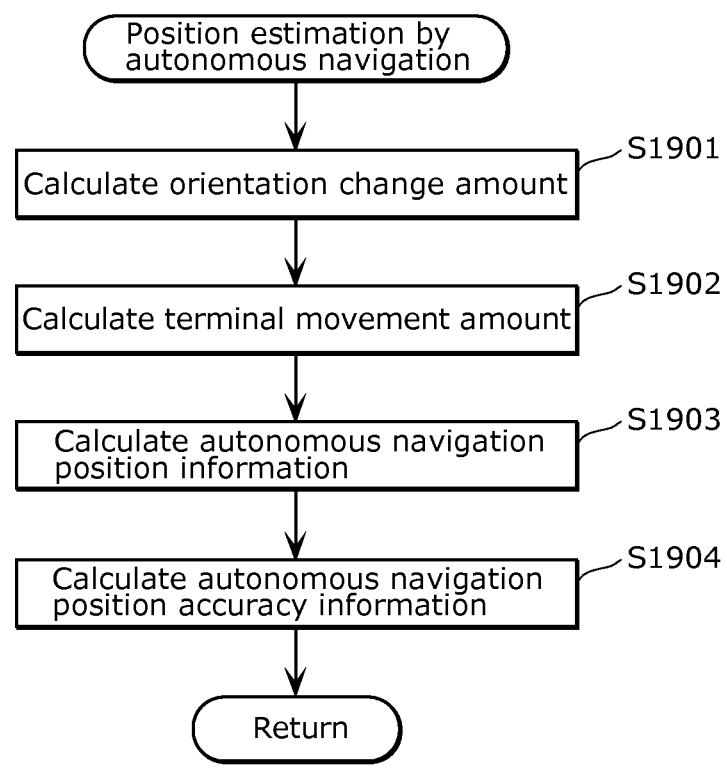
FIG. 19 is a flowchart showing operations of a position estimation device according to Embodiment 1.

FIG. 19 is a flowchart showing the operation of estimating the autonomous navigation position information (S1801).

As shown in FIG. 19, first, the orientation change amount calculation unit 108 calculates an orientation change amount of the target terminal based on the angular velocity information received from the angular velocity sensor 103 (S1901), and the terminal movement amount calculation unit 109 calculates a movement amount of the target terminal based on the acceleration information received from the acceleration sensor 102 and the geomagnetism information received from the geomagnetic sensor 104 (S1902).

Next, the autonomous navigation position estimation unit 110 calculates the autonomous navigation position information based on the current position information at the previous position estimation stored in the storage unit 119 and an amount of movement of the target terminal (S1903). The autonomous navigation position estimation unit 110 then calculates the autonomous navigation accuracy information based on the time period which has elapsed from the previous position estimation and the orientation change amount and the amount of movement of the target terminal from the previous position estimation (S1904).

With the operations shown in FIG. 19, the position estimation device 100 calculates the autonomous navigation position information and the autonomous navigation accuracy information.

Figure 20:
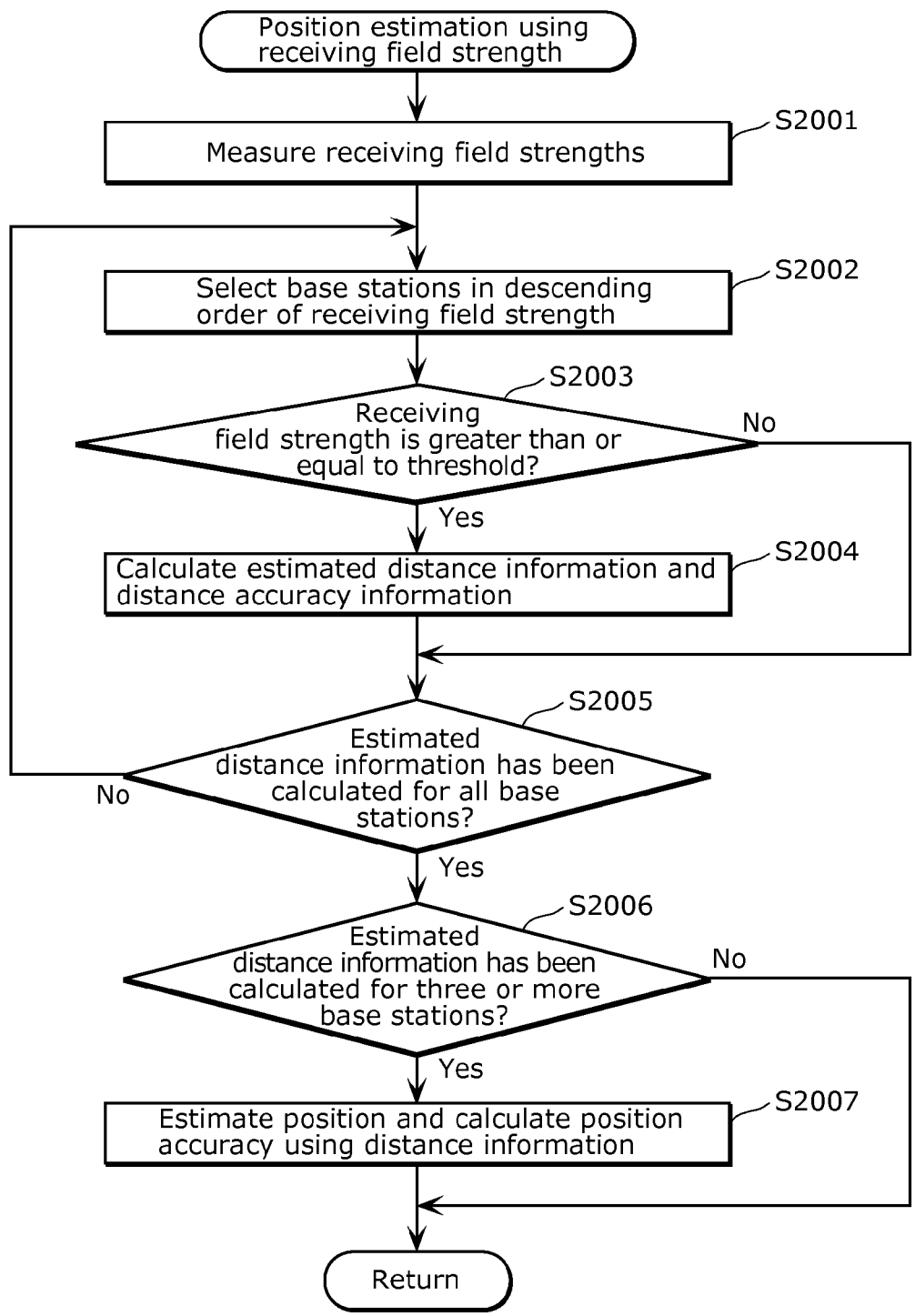
FIG. 20 is a flowchart showing operations of a position estimation device according to Embodiment 1.

FIG. 20 is a flowchart showing the operation of estimating the RSSI position information (S1802). As shown in FIG. 20, first, the wireless strength measurement unit 111 measures the receiving field strengths of signals transmitted by plural base stations (S2001).

Next, the distance estimation unit 112 selects the base stations measured by the wireless strength measurement unit 111, in descending order of the receiving field strength (S2002).

The distance estimation unit 112 determines whether or not the receiving field strength of the selected base station is greater than or equal to a predetermined threshold (S2003). When the receiving field strength is smaller than the threshold, the process proceeds to S2005.

When the receiving field strength of the selected base station is greater than or equal to the threshold, the distance estimation unit 112 estimates the distance between the selected base station and the target terminal and calculates the estimated distance information associated with the base station ID and the distance accuracy information indicating the accuracy of the estimated distance information, based on the receiving strength of the signal received from the selected base station (S2004).

It is to be noted that as shown in FIG. 3, the receiving field strength changes more significantly with decrease in the distance between the wireless station which has transmitted a signal and the wireless station which has received the signal. Thus, the lower the receiving field strength is, the less accurate the estimated distance information is. Therefore, performing the distance estimation only when the receiving strength is greater than or equal to a predetermined threshold ensures the minimal accuracy of the estimated distance information.

Referring back to FIG. 20, the following continues with the description. The distance estimation unit 112 determines whether or not the estimated distance information has been calculated for all the base stations measured by the wireless strength measurement unit 111 (S2005), and the process returns to S2002 when there is still a base station for which the estimated distance information has not been calculated yet.

When the estimated distance information is calculated for all the base stations measured by the wireless strength measurement unit 111, the RSSI position estimation unit 113 determines whether or not the distance estimation unit 112 has calculated the estimated distance information for three or more base stations (S2006). When the distance estimation unit 112 has calculated the estimated distance information for less than three base stations, the process proceeds to S1803.

When the distance estimation unit 112 has calculated the estimated distance information for three or more base stations, the RSSI position estimation unit 113 calculates the RSSI position information and the RSSI accuracy information using the position information on the base stations stored in the storage unit 119 and the estimated distance information (S2007).

Referring back to FIG. 18, the provisional position setting unit 114 calculates, as the provisional position information, a weighted average of the autonomous navigation position information and the RSSI position information using the autonomous navigation accuracy information and the RSSI accuracy information as weights, and calculates, as the provisional position accuracy information, an average value of the autonomous navigation accuracy information and the RSSI accuracy information (S1803).

It is to be noted that when the RSSI position estimation unit 113 cannot estimate the RSSI position information, the autonomous navigation position information and the autonomous navigation accuracy information are used as the provisional position information and the provisional position accuracy information.

The correction unit 118 determines whether or not the provisional position accuracy information is smaller than a predetermined threshold (S1804), and finishes the process when the provisional position accuracy information is greater than or equal to the threshold, determining the provisional position information as the final result of the position estimation.

When the provisional position accuracy information is smaller than the predetermined threshold, the position estimation device 100 corrects the provisional position information using the possible area (S1805).

Figure 21:
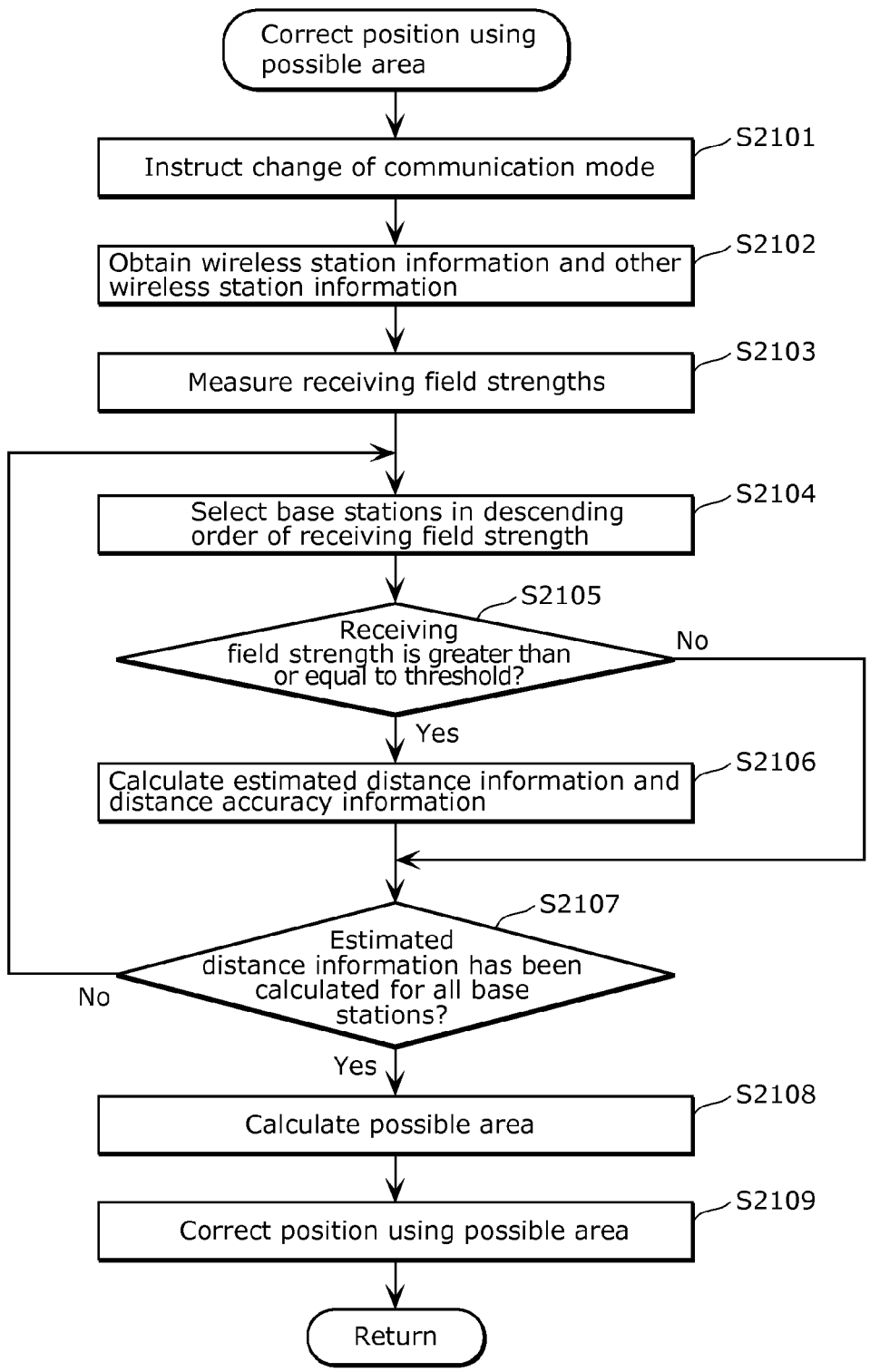
FIG. 21 is a flowchart showing operations of a position estimation device according to Embodiment 1.

FIG. 21 is a flowchart showing operations of correcting the provisional position information using the possible area.

First, the communication mode change instruction unit 115 instructs the wireless stations that belong to the same network to change the communication mode (S2101). Next, the transmission and reception control unit 116 communicates with the wireless stations that belong to the same network and obtains the wireless station information and the other wireless station information (S2102).

Furthermore, the wireless strength measurement unit 111 measures the receiving field strengths of the signals transmitted by the wireless stations that belong to the same network (S2103).

Next, the distance estimation unit 112 selects the base stations measured by the wireless strength measurement unit 111, in descending order of the receiving field strength (S2104).

The distance estimation unit 112 determines whether or not the receiving field strength of the selected base station is greater than or equal to a predetermined threshold (S2105). When the receiving field strength is smaller than the threshold, the process proceeds to S2107.

When the receiving field strength of the selected base station is greater than or equal to the threshold, the distance estimation unit 112 estimates the distance between the selected base station and the target terminal and calculates the estimated distance information associated with the base station ID and the distance accuracy information indicating the accuracy of the estimated distance information, based on the receiving strength of the signal received from the selected base station (S2106).

The distance estimation unit 112 determines whether or not the estimated distance information has been calculated for all the base stations measured by the wireless strength measurement unit 111 (S2107), and the process returns to S2104 when there is still a base station for which the estimated distance information has not been calculated yet.

When the estimated distance information is calculated for all the wireless stations measured by the wireless strength measurement unit 111, the possible area calculation unit 117 calculates the possible area based on the estimated distance information, the wireless station information, the other wireless station information, and the map information (S2108).

When the possible area is calculated, the correction unit 118 corrects the provisional position information using the possible area (S2109) and finishes the process, determining the correction result as the final result of the position estimation (current position information).

<3. Conclusion>

The position estimation device 100 according to the present embodiment calculates the possible area for the provisional position information, using the map information indicating a spatial structure and information on the wireless stations which belong to the same network. The position estimation device 100 then corrects the provisional position information using the possible area.

This configuration enables accurate estimation of the position of the target terminal using the map information and the wireless station information on the wireless stations which belong to the same network, even when there are few base stations and/or when the wireless terminal is not equipped with a special positioning device.

(Supplementary Notes)

Although only an exemplary embodiment of the position estimation device according to an aspect of the present invention has been described above, the present invention is not limited to this embodiment. Those skilled in the art will readily appreciate that various modifications may be made in this embodiment and that other embodiments may be obtained by combining the structural elements of different embodiments without materially departing from the novel teachings and advantages of the present invention. Accordingly, all such modifications and other embodiments may be included in the scope of one or more aspects of the present invention. The exemplified position estimation device may be modified as below. The following describes the examples.

(1) In the above-described embodiment, the base station management information 200 shown in FIG. 2 is stored in the storage unit in advance; however, the present invention is not limited to this.

For example, the base station management information 200 may be stored in an externally-provided storage device, and the target terminal may obtain the base station management information through communication with the storage device as necessary.

(2) In the above-described embodiment, the movement amount of the target terminal is calculated by integrating the acceleration information twice; however, the method of calculating the movement amount of the target terminal is not limited to this. For example, the following is also possible: information on the length of stride or the like of a user of the target terminal is obtained in advance from the user, and the user's steps are detected using the acceleration information, to calculate the product of the length of stride and the steps as the movement amount of the target terminal.

(3) In the above-described embodiment, the possible area of the target terminal is calculated by measuring the trajectories of the target terminal using the wireless stations other than the target terminal as the center; however, the method of calculating the possible area is not limited to this. For example, presuming that the target terminal is present at particular coordinates on the map, the particular coordinates are determined as possible coordinates when a wireless station other than the target terminal is likely to be present on the map based on the estimated distance information, whereas the particular coordinates are determined as impossible coordinates when a wireless station other than the target terminal is not likely to be present on the map based on the estimated distance information. All the coordinates on the map are classified into the possible coordinates or the impossible coordinates, and the resulting set of the possible coordinates may be determined as the possible area.

(4) The above-described embodiment and modifications may be combined in part.

For example, the position estimation device according to the above embodiment is included in the target terminal; however, the present invention is not limited to this. The position estimation device may be included in a server such as a cloud connected with the target terminal via a network.

(5) It is also possible to record on recording media or distribute via various communication paths and so on a control program including program codes which are written in machine language or a high-level language to cause a processor of the position estimation device and various circuits connected to the processor to execute the distance estimation, correction, and other processes described in the above embodiment. Examples of the recording media include IC cards, hard disks, optical discs, flexible disks, ROMs, and flash memories. The distributed control program is provided for use by being stored in a memory and the like which can be read by the processor. As the processor executes the control program, each function described in the above embodiment is implemented. It is to be noted that rather than by directly executing the control program, the processor may execute the control program through compilation or by using an interpreter.

(6) Each functional structural element described in the above embodiment may be realized as a circuit which executes the function of the functional structural element or realized through execution of a program by one or more processors.

In other words, each structural element described in the above embodiment may be realized as dedicated hardware or realized through execution of a software program appropriate for the structural element. Each structural element may be realized through reading and execution, by a program execution unit such as CPU or a processor, of a software program recorded on a recording medium such as a hard disk or a semiconductor memory.

Here, the software program for realizing the position estimation device and so on according to the above embodiment is such a program as follows: Specifically, this program, executed by a computer, includes: setting current position information indicating an estimated current position of a wireless terminal; estimating, using receiving strengths of signals received from plural wireless stations including at least a mobile station, distance information indicating distances from the plural wireless stations to the wireless terminal; calculating, using the distance information and map information indicating a spatial structure, an area in the spatial structure in which the wireless terminal satisfies the distances indicated in the distance information, as a possible area in the spatial structure in which the wireless terminal is likely to be present, the spatial structure including at least a layout of a building; and correcting the current position indicated in the current position information to a position within the possible area when the current position is outside the possible area.

Furthermore, the position estimation device according to an aspect of the present invention may be provided as a package of an integrated circuit such as IC and LSI. This package is incorporated into various devices for use, which allows the various devices to perform each function described in the embodiment.

It is to be noted that each functional block such as the distance estimation unit, each position estimation unit, the possible area calculation unit, and the correction unit is typically realized in the form of an LSI that is an integrated circuit. These LSIs may be manufactured as individual chips, or some or all of the LSIs may be integrated into one chip. Although the name used here is LSI, it is also called IC, system LSI, super LSI, or ultra LSI depending on the degree of integration. Furthermore, the means for circuit integration is not limited to the LSI, and a dedicated circuit and a general-purpose processor are also available. It is also acceptable to use: a field programmable gate array (FPGA) that is programmable after the LSI has been manufactured; and a reconfigurable processor in which connections and settings of circuit cells within the LSI are reconfigurable. Furthermore, if circuit integration technology that replaces LSI appears through progress in the semiconductor technology or other derivative technology, that circuit integration technology can be used for the integration of the functional blocks. Adaptation and so on of biotechnology is one such possibility.

(Supplementary Notes 2)

Figure 22:
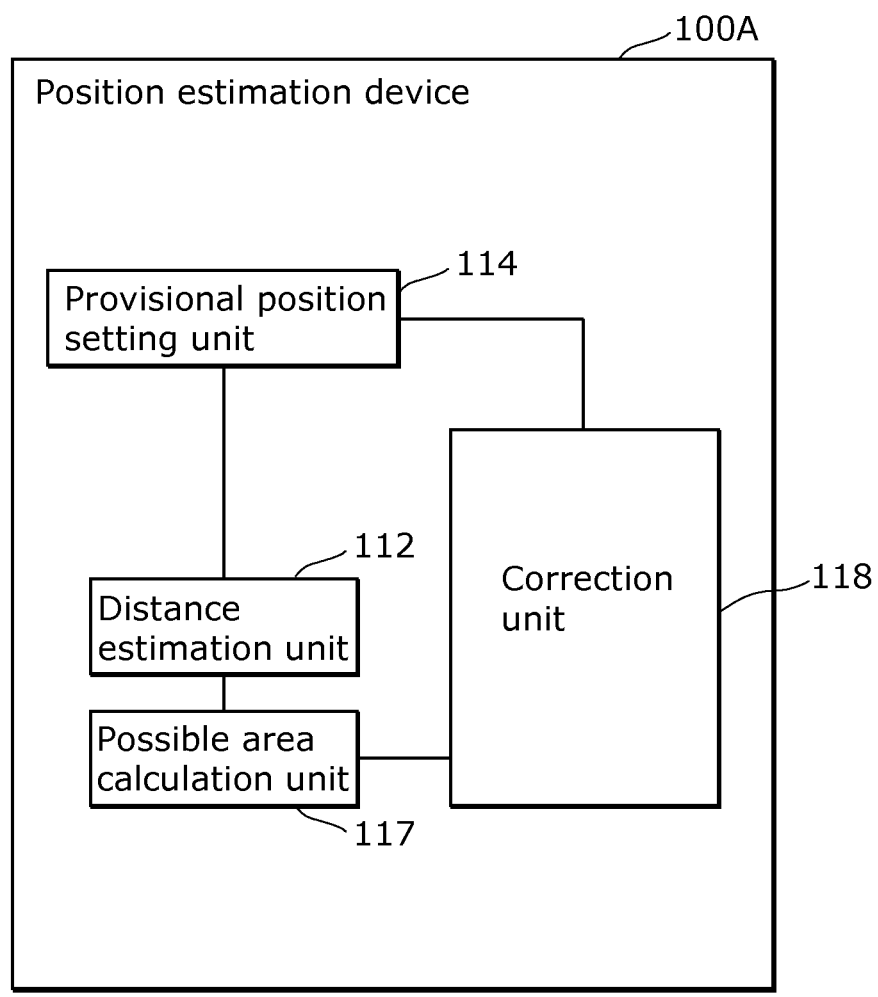
FIG. 22 is a block diagram showing a minimum configuration of a position estimation device.

It is to be noted that although the position estimation device 100 in the above description includes the sensor unit 101, the wireless processing unit 105, the control unit 106, and the storage unit 119, the position estimation device is not limited to this. As shown in FIG. 22, a position estimation device 100A is sufficient as the minimum configuration of the position estimation device. Specifically, the position estimation device 100A including the distance estimation unit 112, the provisional position setting unit 114, the possible area calculation unit 117, and the correction unit 118 is sufficient.

More specifically, the position estimation device 100A is sufficient which includes: the provisional position setting unit 114 configured to set current position information indicating an estimated current position of a wireless terminal; the distance estimation unit 112 configured to estimate, using receiving strengths of signals received from plural wireless stations including at least a mobile station, distance information indicating distances from the plural wireless stations to the wireless terminal; the possible area calculation unit 117 configured to calculate, using the distance information and map information indicating a spatial structure, an area in the spatial structure in which the wireless terminal satisfies the distances indicated in the distance information, as a possible area in the spatial structure in which the wireless terminal is likely to be present, the spatial structure including at least a layout of a building; and the correction unit 118 configured to correct the current position indicated in the current position information to a position within the possible area when the current position is outside the possible area.

With at least the position estimation device 100A, the position of a wireless terminal can be estimated with higher accuracy using the map information and the distance information indicating the distances from the wireless station without requiring addition of a special positioning device even when there are few base stations whose positions are known in advance.

Figure 23:
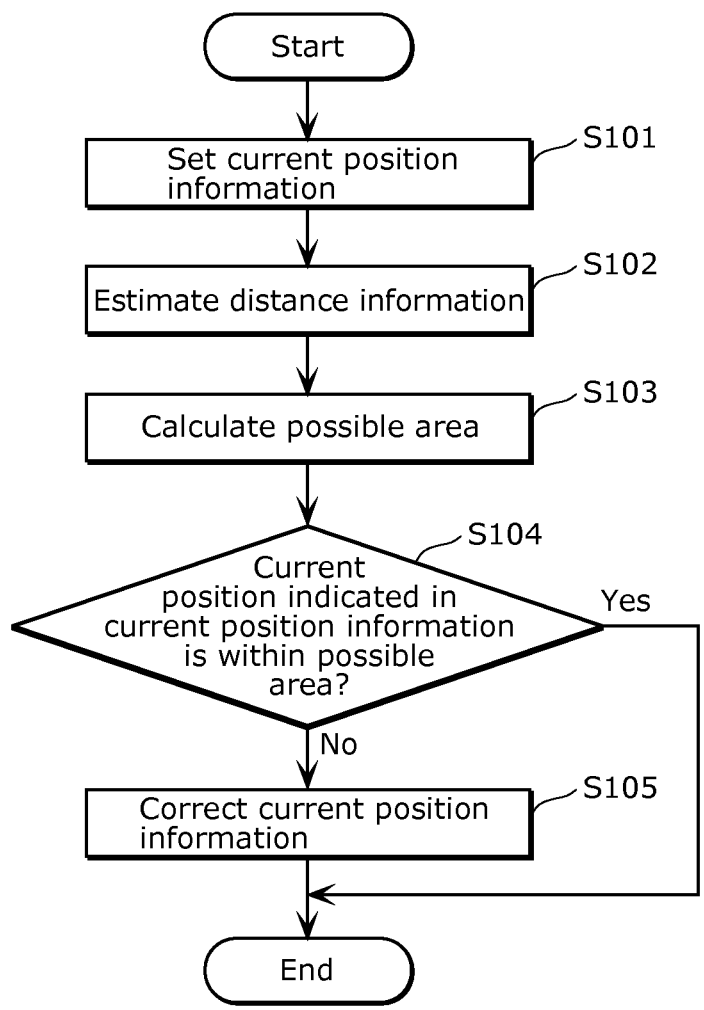
FIG. 23 is a flowchart showing operations of a position estimation device shown in FIG. 22.

It is to be noted that an aspect of the position estimation device 100A may be realized by a method shown in FIG. 23. More specifically, it may be realized by a method including setting current position information indicating an estimated current position of a wireless terminal (S101); estimating, using receiving strengths of signals received from plural wireless stations including at least a mobile station, distance information indicating distances from the plural wireless stations to the wireless terminal (S102); calculating, using the distance information and map information indicating a spatial structure, an area in the spatial structure which can maintain the distances indicated in the distance information, as a possible area in the spatial structure in which the wireless terminal is likely to be present, the spatial structure including at least a layout of a building (S103); and correcting the current position indicated in the current position information to a position within the possible area (S105) when the current position is outside the possible area (No in S104).

The position estimation device according to the present disclosure can be used for various applications such as mobile phones, PHSs, wristwatches, and wireless tags.

REFERENCE SIGNS LIST 100, 100A Position estimation device
101 Sensor unit
102 Acceleration sensor
103 Angular velocity sensor
104 Geomagnetic sensor
105 Wireless processing unit
106 Control unit
107 Terminal information calculation unit
108 Orientation change amount calculation unit
109 Terminal movement amount calculation unit
110 Autonomous navigation position estimation unit
111 Wireless strength measurement unit
112 Distance estimation unit
113 RSSI position estimation unit
114 Provisional position setting unit
115 Communication mode change instruction unit
116 Transmission and reception control unit
117 Possible area calculation unit
118 Correction unit
119 Storage unit
200 Base station management information
500 Map information
500A, 500B, 500C, 500D, 800A, 800B, 1000A, 1000B, 1200A, 1200B, 1200C, 1200D, 1200E Map
600 Wireless station information
700 Other wireless station information

The invention claimed is:

1. A position estimation device comprising:
a setting unit configured to set current position information indicating an estimated current position of a wireless terminal, the wireless terminal including a mobile station;
an estimation unit configured to estimate, using receiving strengths of signals received from plural wireless stations including mobile stations, distance information indicating distances from the plural wireless stations including the mobile stations to the wireless terminal;
a calculation unit configured to calculate, using the distance information and map information indicating a spatial structure, a geometric area in the spatial structure in which the wireless terminal is likely to be present, the geometric area being movable based on movement of the wireless terminal within a range in the spatial structure in which the wireless terminal is movable, the spatial structure including at least a layout of a building, and the geometric area in the spatial structure including straight lines each having vertices indicating one of the distances from the plural wireless stations to the wireless terminal; and
a correction unit configured to correct the current position indicated in the current position information to a position within a possible area when the current position is outside the possible area.

2. The position estimation device according to claim 1, wherein the position estimation device is in the wireless terminal.

3. The position estimation device according to claim 1, wherein the spatial structure indicated in the map information includes the layout of the building and a position, in the building, of an obstacle which attenuates a signal, and
when the obstacle is present in the spatial structure in a first distance indicated in the distance information, the calculation unit is configured to calculate the possible area using a second distance which is obtained by correcting the first distance according to the obstacle.

4. The position estimation device according to claim 1, further comprising
an instruction unit configured to instruct wireless stations which, among the plural wireless stations, belong to a same network to change a communication mode,
wherein the estimation unit is configured to measure receiving strengths of signals transmitted by the wireless stations which have changed the communication mode in response to the instruction, and estimate the distance information using the measured receiving strengths.

5. The position estimation device according to claim 1, further comprising
an obtaining unit configured to communicate with each of the plural wireless stations and obtain wireless station information held by each of the plural wireless stations,
wherein the calculation unit is configured to calculate the possible area using the map information, the distance information, and the wireless station information.

6. The position estimation device according to claim 5, wherein the wireless stations include a mobile station and a fixed station, and
the wireless station information, when held by one of the wireless stations which is the fixed station, includes position information indicating a position of the fixed station.

7. The position estimation device according to claim 5, wherein the wireless station information includes distance information indicating a distance between one of the wireless stations which holds the wireless station information and a different one of the wireless stations.

8. The position estimation device according to claim 5, wherein the wireless station information includes a transmitting strength of a signal transmitted by the wireless station holding the wireless station information, and
the estimation unit is configured to estimate the distance information using the receiving strengths and the transmitting strength.

9. The position estimation device according to claim 1, further comprising
a detection unit configured to detect acceleration information on the wireless terminal and direction information on the wireless terminal,
wherein the setting unit is configured to set, as the current position information, a current position estimated by autonomous navigation using the acceleration information and the direction information detected by the detection unit.

10. The position estimation device according to claim 1, wherein the estimation unit is configured to estimate, using a receiving strength of a signal received from a base station included in the plural wireless stations, distance information indicating a distance from the base station to the wireless terminal, and
the setting unit is configured to set, as the current position information, a position of the wireless terminal estimated using the distance information indicating the distance from the base station to the wireless terminal and position information on the base station.

11. The position estimation device according to claim 1, further comprising:
a detection unit configured to detect acceleration information on the wireless terminal and direction information on the wireless terminal; and
an autonomous navigation position estimation unit configured to estimate the current position of the wireless terminal by autonomous navigation using the acceleration information and the direction information detected by the detection unit, wherein the setting unit is configured to set, as the current position information, the current position estimated by the autonomous navigation position estimation unit.

12. The position estimation device according to claim 11, further comprising a determination unit configured to determine whether or not the current position information set by the setting unit needs to be corrected, based on current position accuracy indicating accuracy of the current position estimated by the autonomous navigation position estimation unit, wherein the determination unit is configured to determine that the current position information needs to be corrected when the current position accuracy is lower than or equal to a threshold, and the calculation unit is configured to calculate the possible area only when the determination unit determines that the current position information needs to be corrected.

13. The position estimation device according to claim 12, wherein the current position accuracy has a value which decreases with increase in interval between a first time and a second time to indicate a decrease in the accuracy of the current position, the first time being a time at which the current position has been estimated by the autonomous navigation position estimation unit and the second time being a time at which a previous current position before the current position has been estimated by the autonomous navigation position estimation unit.

14. A position estimation method comprising:

setting current position information indicating an estimated current position of a wireless terminal, the wireless terminal including a mobile station;

estimating, using receiving strengths of signals received from plural wireless stations including mobile stations, distance information indicating distances from the plural wireless stations including the mobile stations to the wireless terminal;

calculating, using the distance information and map information indicating a spatial structure, a geometric area in the spatial structure in which the wireless terminal is likely to be present, the geometric area being movable based on the movement of the wireless terminal within a range in the spatial structure in which the wireless terminal is movable, the spatial structure including at least a layout of a building, and the geometric area in the spatial structure including straight lines each having vertices indicating one of the distances from the plural wireless stations to the wireless terminal; and correcting the current position indicated in the current position information to a position within a possible area when the current position is outside the possible area.

15. A non-transitory computer-readable recording medium for use in a computer, the recording medium having a computer program recorded thereon for causing the computer to execute:

setting current position information indicating an estimated current position of a wireless terminal, the wireless terminal including a mobile station;

estimating, using receiving strengths of signals received from plural wireless stations including mobile stations, distance information indicating distances from the plural wireless stations including the mobile stations to the wireless terminal;

calculating, using the distance information and map information indicating a spatial structure, a geometric area in the spatial structure in which the wireless terminal is likely to be present, the geometric area being movable based on the movement of the wireless terminal within a range in the spatial structure in which the wireless terminal is movable, the spatial structure including at least a layout of a building, and the geometric area in the spatial structure including straight lines each having vertices indicating one of the distances from the plural wireless stations to the wireless terminal; and correcting the current position indicated in the current position information to a position within a possible area when the current position is outside the possible area.

16. An integrated circuit which estimates a current position of a wireless terminal, the integrated circuit comprising:

a setting circuit configured to set current position information indicating an estimated current position of a wireless terminal, the wireless terminal including a mobile station;

an estimation circuit configured to estimate, using receiving strengths of signals received from plural wireless stations including mobile stations, distance information indicating distances from the plural wireless stations including the mobile stations to the wireless terminal;

a calculation circuit configured to calculate, using the distance information and map information indicating a spatial structure, a geometric area in the spatial structure in which the wireless terminal is likely to be present, the geometric area being movable based on movement of the wireless terminal within a range in the geometric area of the spatial structure in which the wireless terminal is movable, the spatial structure including at least a layout of a building, and the geometric area in the spatial structure including straight lines each having vertices indicating one of the distances from the plural wireless stations to the wireless terminal; and a correction circuit configured to correct the current position indicated in the current position information to a position within a possible area when the current position is outside the possible area.

* * * * *